(12) United States Patent
Bertino

(10) Patent No.: US 9,775,294 B2
(45) Date of Patent: Oct. 3, 2017

(54) MODULAR GATHERING PLATFORM FOR GRAIN HARVESTERS

(71) Applicant: Indústrias Reunidas Colombo Ltda., Pindorama (BR)

(72) Inventor: Luiz Henrique Bertino, Pindorama (BR)

(73) Assignee: Indústrias Reunidas Colombo Ltda., Pindorama (BR)

( * ) Notice: Subject to any disclaimer, the term of this patent is extended or adjusted under 35 U.S.C. 154(b) by 0 days.

(21) Appl. No.: 15/192,631

(22) Filed: Jun. 24, 2016

(65) Prior Publication Data

US 2017/0000028 A1    Jan. 5, 2017

(30) Foreign Application Priority Data

Jun. 30, 2015   (BR) .......................... 102015015860

(51) Int. Cl.
| | | |
|---|---|---|
| *B65G 21/10* | (2006.01) | |
| *A01D 57/20* | (2006.01) | |
| *A01D 29/00* | (2006.01) | |
| *A01B 73/00* | (2006.01) | |
| *A01D 51/00* | (2006.01) | |
| *A01D 57/12* | (2006.01) | |

(52) U.S. Cl.
CPC .......... *A01D 51/002* (2013.01); *A01D 57/12* (2013.01)

(58) Field of Classification Search
CPC ........ A01D 57/20; A01D 84/00; A01D 29/00; A01D 33/02; A01B 73/00; B65G 21/02; B65G 21/06

USPC ....... 198/860.1, 860.2; 171/61, 101; 56/126, 56/192
See application file for complete search history.

(56) References Cited

U.S. PATENT DOCUMENTS

| | | |
|---|---|---|
| 2,507,635 A | 5/1950 | James |
| 2,999,547 A | 9/1961 | Long |
| 3,241,619 A | 3/1966 | Morrow |
| 3,260,314 A | 7/1966 | Edwards |

(Continued)

FOREIGN PATENT DOCUMENTS

| | | |
|---|---|---|
| BR | P18305764 | 5/1985 |
| BR | MU6600133 | 6/1986 |

(Continued)

*Primary Examiner* — James R Bidwell
(74) *Attorney, Agent, or Firm* — B. Aaron Schulman; Stites & Harbison PLLC

(57) ABSTRACT

A modular gathering platform for grain harvesters is provided for coupling to the front of a grain harvester or processor which can gather plants previously prepared in one or more rows by at least one central belt conveyor with functional side by side coupling to other equal harvesting conveyor belts. The platform includes a transversal mounting structure having an internal opening, at least one central harvesting conveyor belt having front and rear extremities and two side couplings, additional harvesting conveyor belts coupled to the sides of the central belt, an anti-jamming roll and a rotating guiding roll. The central harvesting conveyor belt and additional side harvesting conveyor belts, the anti-jamming rolls, and the guiding roll are synchronized by an actuation assembly, and the guiding roll moves the harvested plants towards the exit. The platform advantageously allows for the gathering of a crop that has been prepared in rows.

11 Claims, 22 Drawing Sheets

(56) References Cited

U.S. PATENT DOCUMENTS

| | | | |
|---|---|---|---|
| 3,381,455 A | | 5/1968 | Mitchell |
| 3,565,178 A | | 2/1971 | Whitfield |
| 3,613,797 A | | 10/1971 | Whitfield |
| 3,734,194 A | | 5/1973 | Whitfield |
| 4,184,314 A | | 1/1980 | Hobbs |
| 4,230,188 A | | 10/1980 | Paulk |
| 4,232,744 A | | 11/1980 | Thompson |
| 4,257,486 A | | 3/1981 | Hobbs |
| 4,607,703 A | | 8/1986 | Wang |
| 4,938,010 A | * | 7/1990 | Guinn .................. A01D 57/20 56/181 |
| 8,166,739 B2 | * | 5/2012 | Dow .................. A01B 73/02 56/192 |
| 8,919,088 B2 | * | 12/2014 | Dow .................. A01B 73/00 56/192 |
| 9,078,396 B2 | * | 7/2015 | Yanke ................ A01D 61/008 |
| 9,198,357 B2 | * | 12/2015 | Gantzer ............... A01D 84/00 |
| 2009/0320431 A1 | * | 12/2009 | Puryk .................. A01D 41/14 56/181 |
| 2015/0272002 A1 | * | 10/2015 | Honey .................. A01D 34/01 56/153 |

FOREIGN PATENT DOCUMENTS

| | | |
|---|---|---|
| BR | P18704119 | 2/1989 |
| BR | PI9102501 | 1/1993 |
| BR | MU 7801088-8 | 2/2000 |
| BR | MU 7900686-8 | 8/2000 |
| BR | MU 7900789-9 | 9/2000 |
| BR | MU 8400507-6 | 10/2005 |
| BR | MU 8403436-0 U | 8/2006 |
| BR | MU 8201891 | 12/2006 |
| BR | MU 8502220-9 | 1/2007 |
| BR | MU 8502092-3 | 5/2007 |
| BR | MU8701571-4 | 5/2009 |
| BR | PI0901370-9 | 1/2011 |
| BR | 102015007088 | 3/2015 |
| CN | 201004807 | 2/2007 |
| CN | 203206730 | 9/2013 |
| CN | 103355051 | 10/2013 |
| CN | 103371017 | 10/2013 |
| CN | 103371018 | 10/2013 |
| CN | 203226028 | 10/2013 |
| CN | 203261721 | 11/2013 |
| CN | 103430683 | 12/2013 |
| CN | 103430684 | 12/2013 |
| CN | 103444347 | 12/2013 |
| CN | 103460884 | 12/2013 |
| CN | 103460885 | 12/2013 |
| CN | 103460886 | 12/2013 |
| CN | 103460887 | 12/2013 |
| CN | 203313669 | 12/2013 |
| CN | 203353141 | 12/2013 |
| CN | 203353142 | 12/2013 |
| CN | 203353143 | 12/2013 |
| CN | 203353202 | 12/2013 |

* cited by examiner

MODULAR GATHERING PLATFORM FOR GRAIN HARVESTERS

FIELD OF INVENTION

The present invention is in the field of grain harvesters.

STATE OF THE ART

There are currently numerous equipments and machines used to reap, line up, gather and clean grains. For peanuts, for example by the documents BR6600133, BR8305764, BR8704119, BR9102501, BRMU8400507, BRMU8403436, BRMU8502220, BRMU8701571, BRPI0901370, BR102015007088, BRMU7801088, BRMU7900686, MU7900789, BRMU8201891, CN103355051, CN103371017, CN103371018, CN103430683, CN103430684, CN103444347, CN103460884, CN103460885, CN103460886, CN103460887, CN201004807, CN203206730, CN203226028, CN203261721, CN203313669, CN203353141, CN203353142, CN203353143, CN203353202, BRMU8502092, U.S. Pat. Nos. 2,999,547, 3,260,314, 3,565,178, 3,613,797, 3,734,194, 4,184,314, 4,230,188, 2,507,635, 3,241,619, 3,381,455, 4,230,188, 4,232,744, 4,257,486 and U.S. Pat. No. 4,607,703.

In many of the machines cited above, the first assembly is a transversal platform, whose purpose is to gather the plants and send them to the inside of the machine, where a continuous cleaning process takes place to separate the peanut fruits from the other disposable parts of the plant.

In general, the gathering assemblies of the state of the art are efficient; however, through field studies, it was observed they could be redesigned with technical and functional improvements, and meet other economic objectives.

As it can be seen, there are various cultures of grains that are lined up before being gathered and cleaned. Peanuts is one of these cultivations, which after being lined up and prepared to be gathered, requires a specific assembly for this purpose. What is needed therefore is a body to be assembled on the front of a harvester or processor of different types of grain cultivations, mainly peanuts. This way, the present invention was developed with constructive details specially created to provide advantageous means for gathering of the peanut cultivation after it has been prepared in rows.

SUMMARY OF THE INVENTION

The present invention seeks to provide a platform to combine various assemblies that work in synchronization, in a way that each row of peanuts may be gathered and taken to the inside if the machine. This type of this machine may vary considerably; however, it is usually of the type that processes the plants gathered and completely separates the disposable parts from the fruits, in this case, the peanuts.

Another objective of the invention is to meet the specific necessity of enabling this assembly to be used in differently sized harvesters to serve small, medium and big producers. In this manner, this platform features a modular innovative system defined by a belt conveyor that can be combined side by side to others just like it. Consequently, this platform can be manufactured specifically to add to its sides other equal belt conveyors to form a platform with 1, 2, 3, 4 or more belt conveyors, and consequently allow two or more rows to be gathered simultaneously. These factors allows this assembly to be adequate for small, medium and large producers.

One other objective of this invention is to implement a belt conveyor defined as a pair of parallel chains interconnected by various transversal combs. These combs provide means for the plants to be gathered and stably moved over said belt conveyor, which at the end, unloads the gathered plants on an anti jamming roll, which pushes the plants backwards and features constructive details to remove said plants from the combs and to move the plants at a uniform speed to avoiding any jamming and tangling. After the anti-jamming roll, the plants are unloaded inside a conductive cylinder with transporting inversed threads, staying concentrated in its center. There, a set of claws and a cleaning comb guide the plants to an exit that unloads inside any machine that will process the material gathered and carry out a continuous cleaning and sorting process of the fruits and the disposable materials.

DETAILED DESCRIPTION OF THE INVENTION

Figure 1:
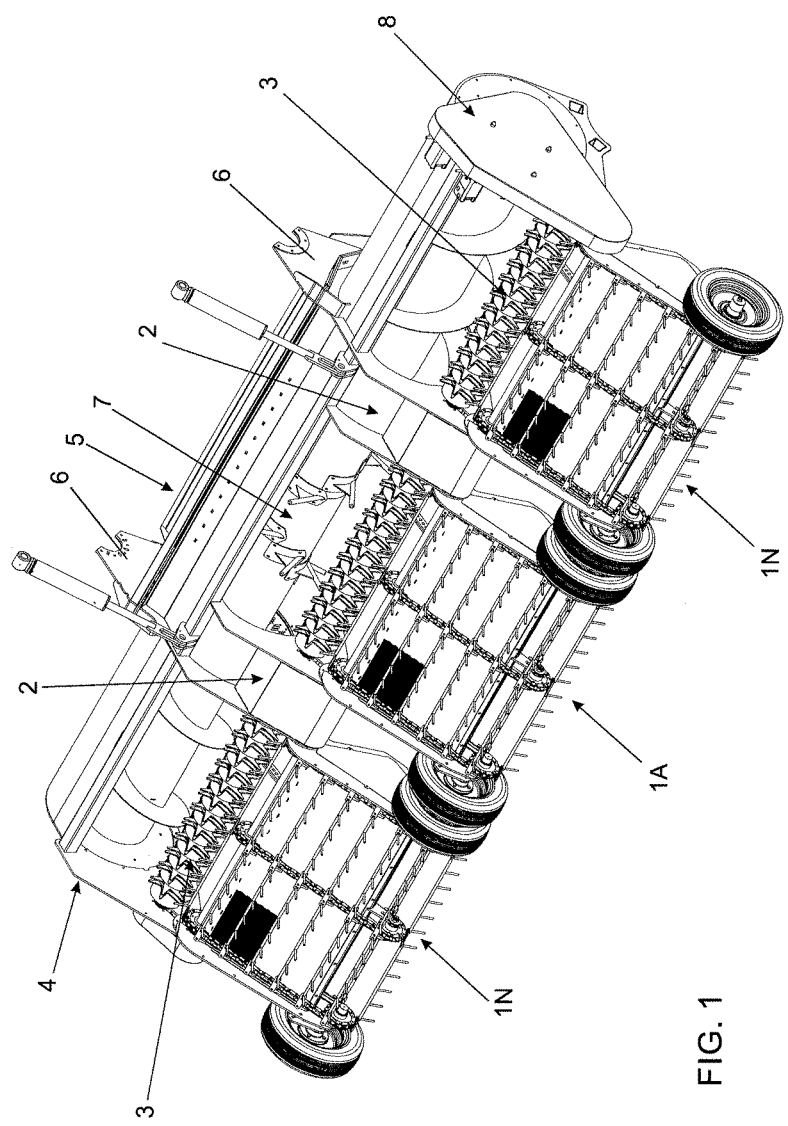
FIG. 1 shows an anterosuperior angled perspective view showing the platform completely assembled.
Figure 2:
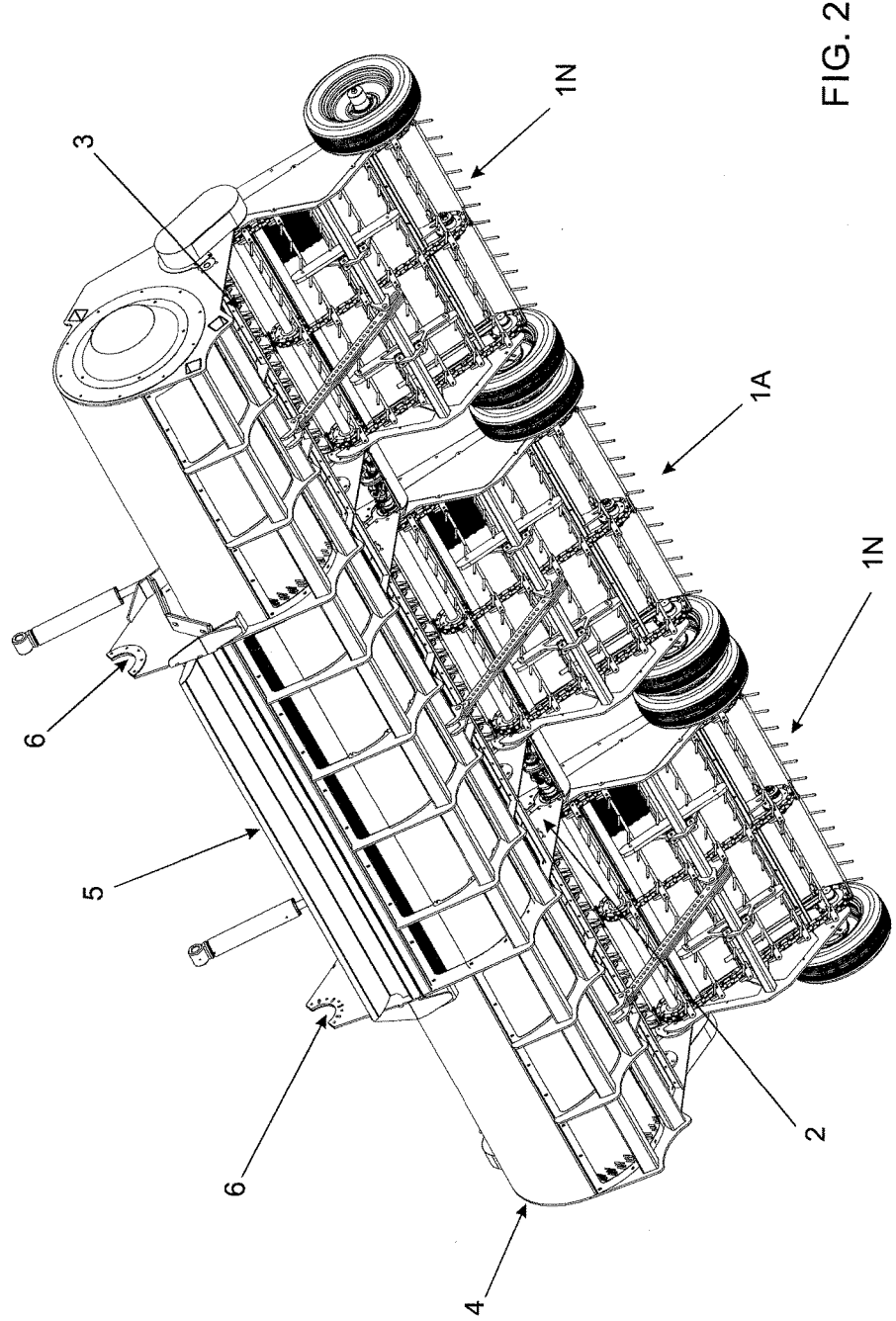
FIG. 2 shows a posteroinferior perspective view of the platform.
Figure 3:
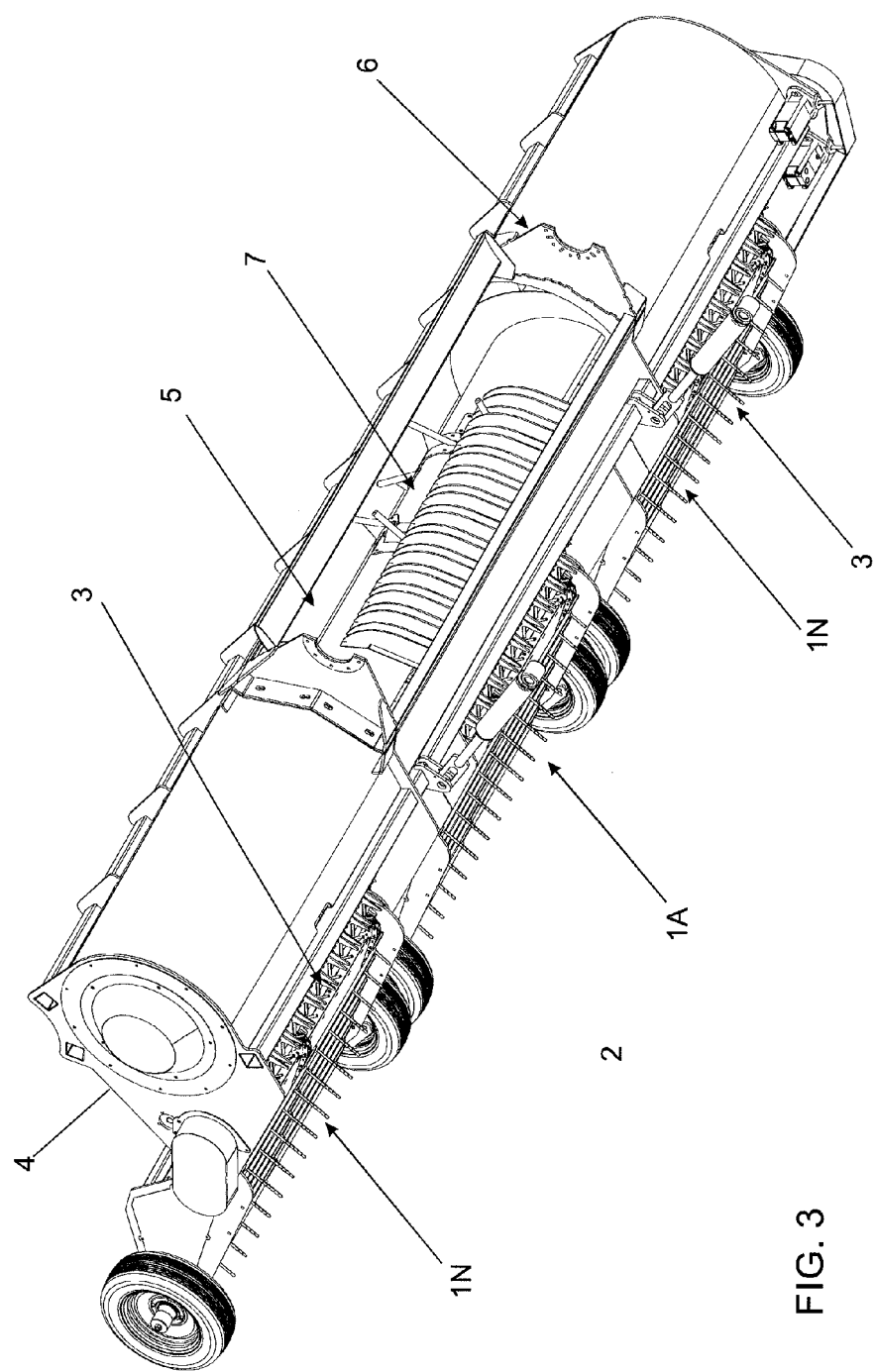
FIG. 3 shows a third perspective view of the assembly and its posterior side, highlighting the exit of the gathered material.
Figure 4:
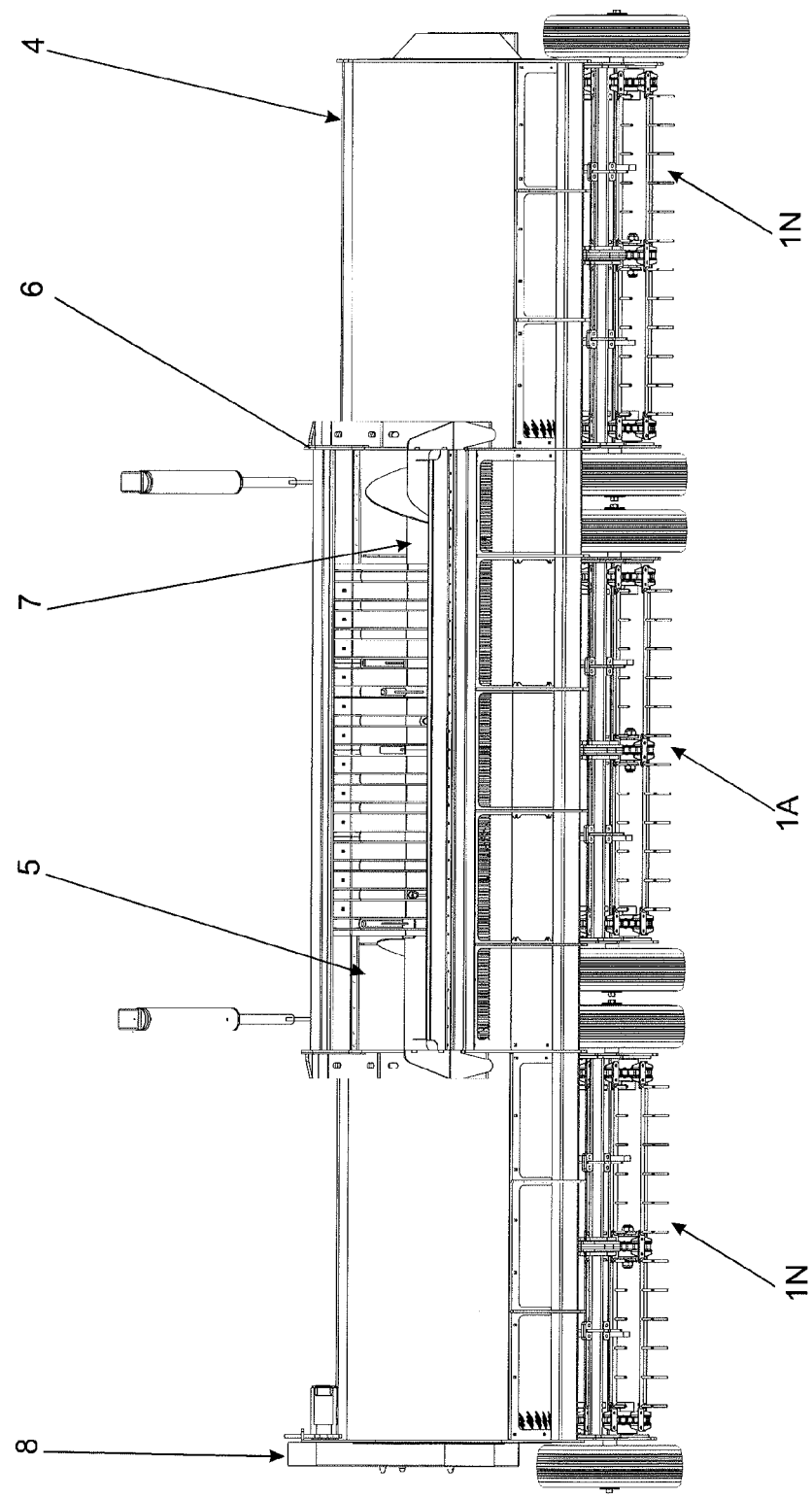
FIG. 4 shows the platform according to an elevated posterior view, also highlighting the exit of the gathered material.
Figure 5:
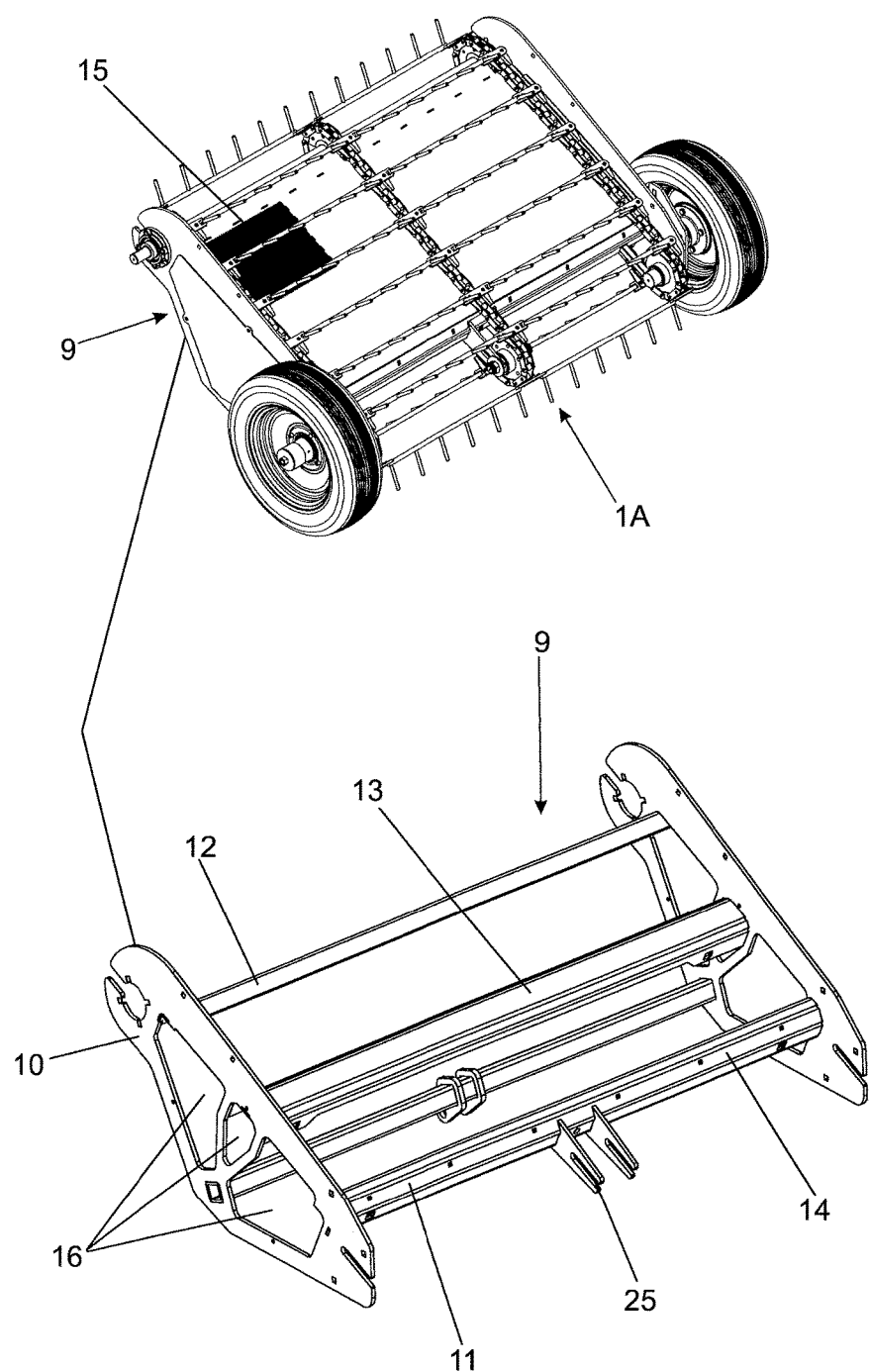
FIG. 5 shows a perspective view of only one of the harvesting conveyor belts, and an amplified perspective detail highlighting the constructive details of its structure.
Figure 6:
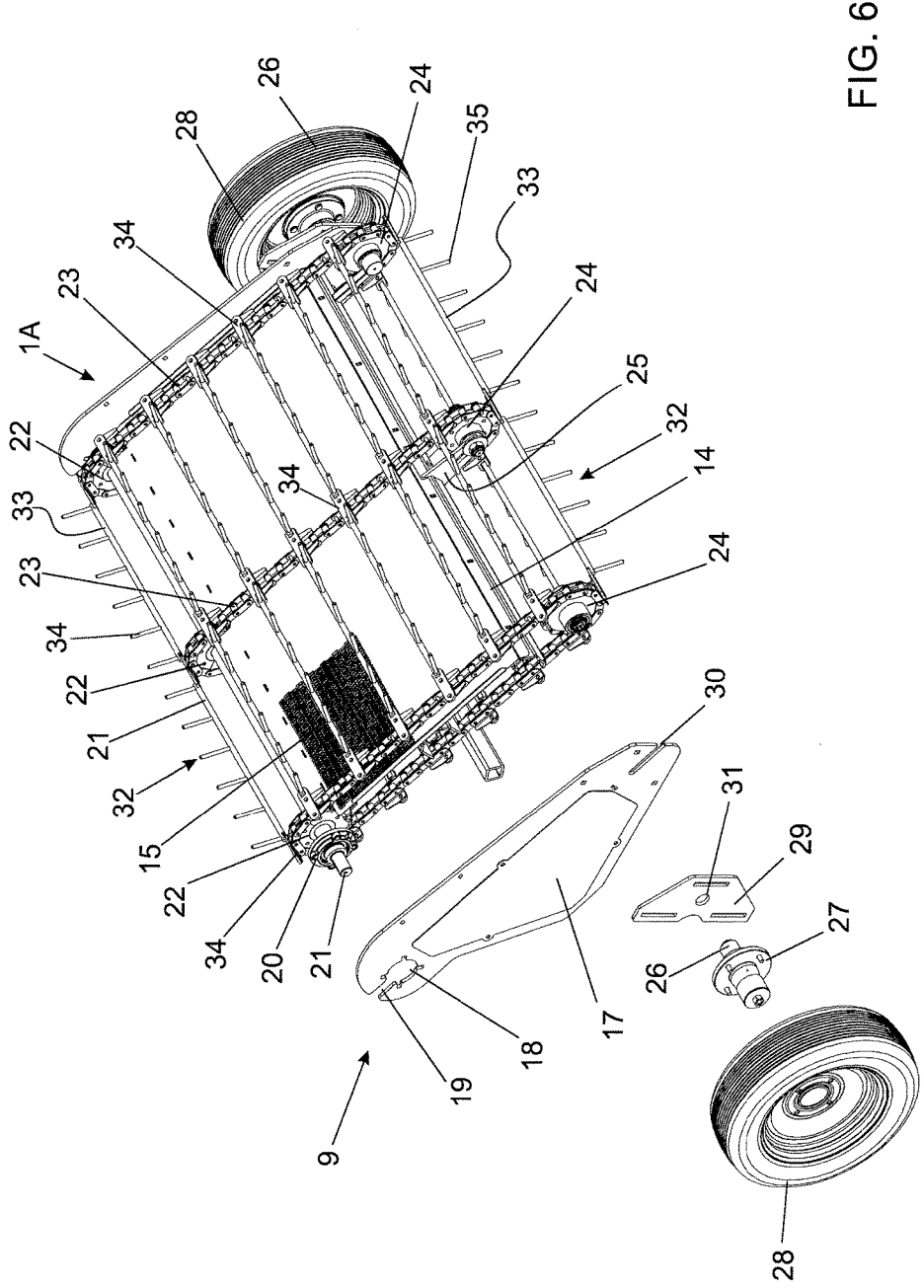
FIG. 6 shows a partially exploded perspective view of the belt conveyor in an anterosuperior angle.
Figure 7:
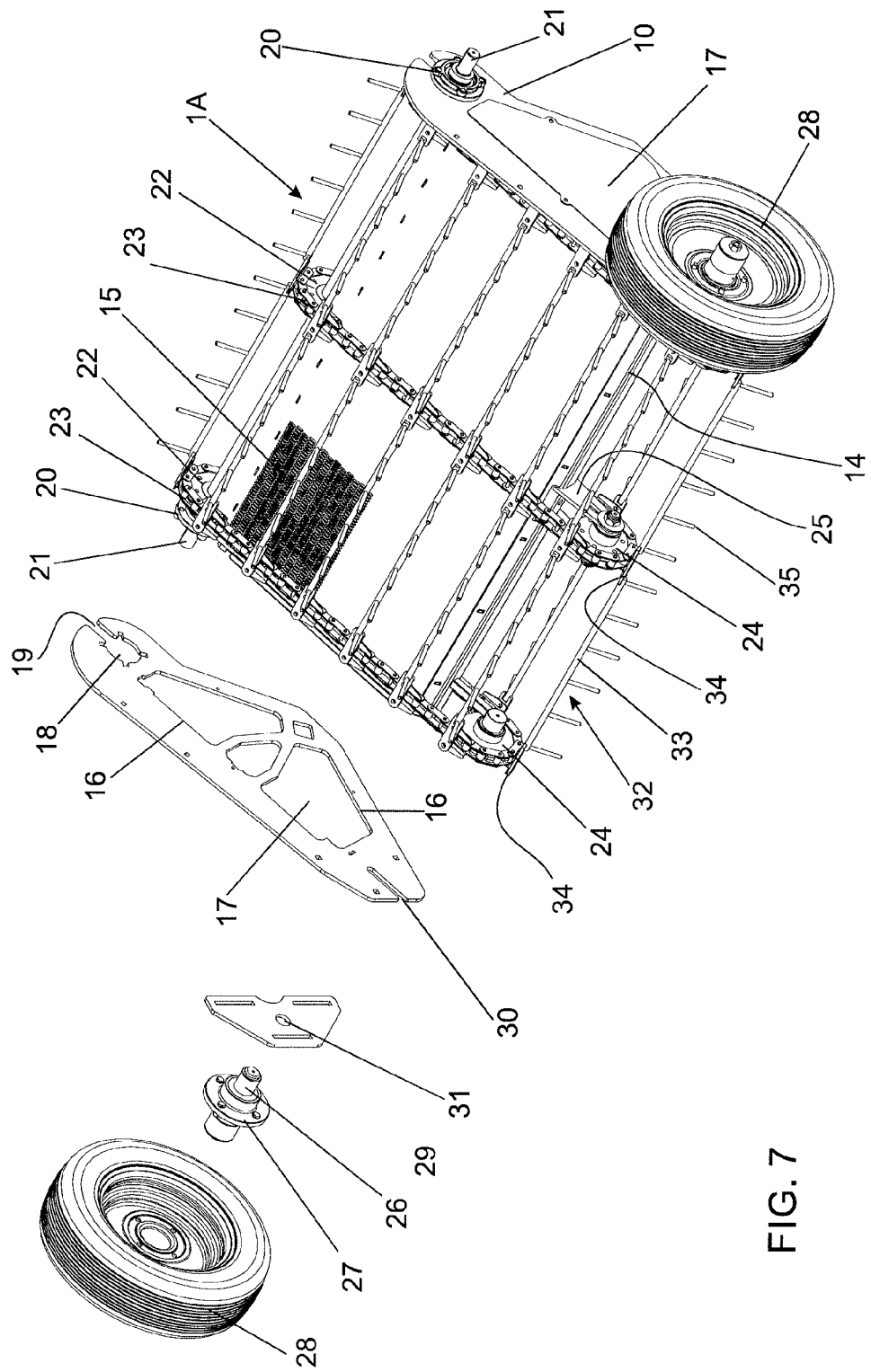
FIG. 7 shows the same view as the one before, however, in a different angle. It shows the constructive details of the harvesting conveyor belt.
Figure 8:
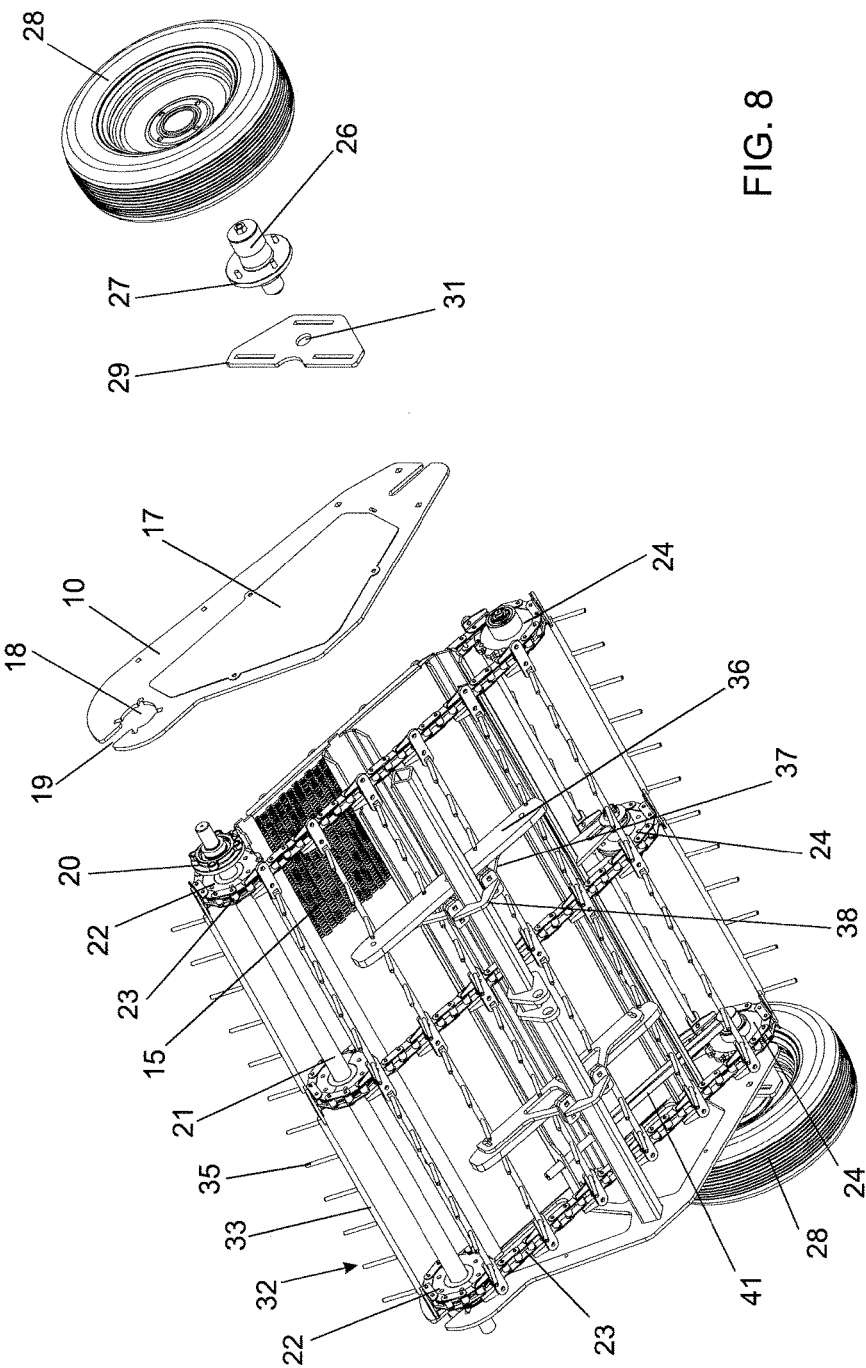
FIG. 8 shows another exploded view in perspective showing the belt conveyor in a posteroinferior angle.

The modular gathering platform for grain harvesters of the present invention, as seen in FIGS. 1-4 comprises at least one central harvesting conveyor belt (1A) with functional side by side coupling means (2) with other equal harvesting conveyor belts (1N), all of them positioned with their variable inclination, with their front extremity stays level with the ground to gather a row that was previously prepared, while their opposite extremities also equally aligned with their respective anti jamming roll (3). These rolls and the upper extremities of the belts conveyors (1A-1N) are assembled on the front of a transversal mounting structure (4) that, by its outer rear, has an ample exit (5) for harvested plants, as it also presents articulated means (6) for coupling to the front of a machine, not illustrated, that processes harvested plants and sorts the fruits from the disposable parts.

Inside of said mounting structure (4) is assembled a rotating guiding roll for the plants (7) with means to receive the plants that have been gathered by each belt conveyor and concentrate them on the center of said structure and move them towards the exit (5) where they will be kept moving by the machine that will process said plants.

The harvesting conveyor belts (1A-1N), the anti jamming rolls (3) and the guiding roll for the plants (7) are synchronized by an actuation assembly (8).

As it has already been said, the harvesting conveyor belts (1A-1N) are identical and one of them is illustrated in FIGS. 5 to 9, where it can be seen that it is formed by a structure (9) composed by two equal side plates (10), ordinarily triangular, with one of its vertices facing down. They are interlinked by a tubular and squared crosspiece (11), while the other are interlinked by cross-pieces in the shape of plate profiles: one with a corner bracket section (12), a U-shaped intermediate one (13), and a C-shaped one (14), all of them with their superior side aligned according to a support plane for the plate sieves assembly (15).

Plates (10), as illustrated also by FIGS. 6,7,8 and 9, have many irregular openings (16) covered by plate inspection lids (17), as well as the superior extremities of said side plates (10) have circular openings (18) and cuts (19) which form housing for bearings (20) that provide rotating support for an shaft (21)), on which is located three gears (22) and respective chains (23), which are in the same way connected in its opposite side to other gears (24), a middle one mounted in a fork (25) that is welded in the inferior cross piece (14) and two external ones mounted together with the cube (27) shaft (26) of the wheel (28), that are complemented by reinforcement plates (29) fixed to the lower extremities of the side plates (10), where housing in the form of cuts (30) and holes (31) are provided for the shaft (26) of the wheels (28)

This way, a chain (23) is positioned in the middle, while other two chains (23) are positioned by the inner sides of the side plates (10), all of them pass over and under the sieve assembly (15) dragging many transversal combs (32), each of these combs (32) formed by a bar (33) with short flat pieces (34) in its extremities attached to the corresponding chains. Each bar (33) has many radial teeth in the form of short cylindrical rods (35) that work like raking claws gathering the row of plants and moving them upwards along the belt conveyor. The sieve assembly (15) returns unwanted particles such as dirt, to the ground along this described route.

Figure 10:
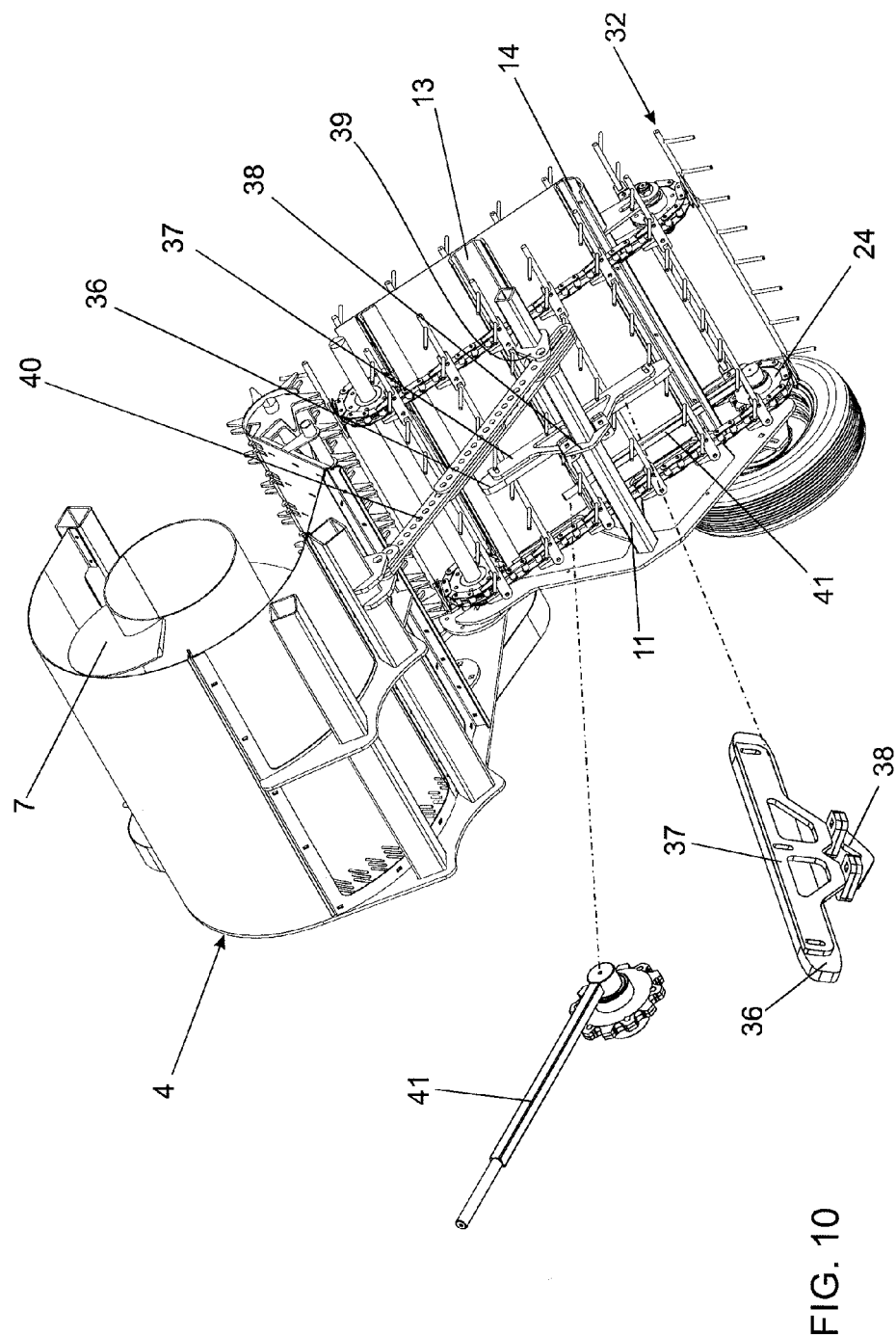
FIG. 10 shows a perspective sectional view and two details, highlighting the constructive details of the stretcher and of the supporting guides of the moving parts of the harvesting conveyor belt.
Figure 11:
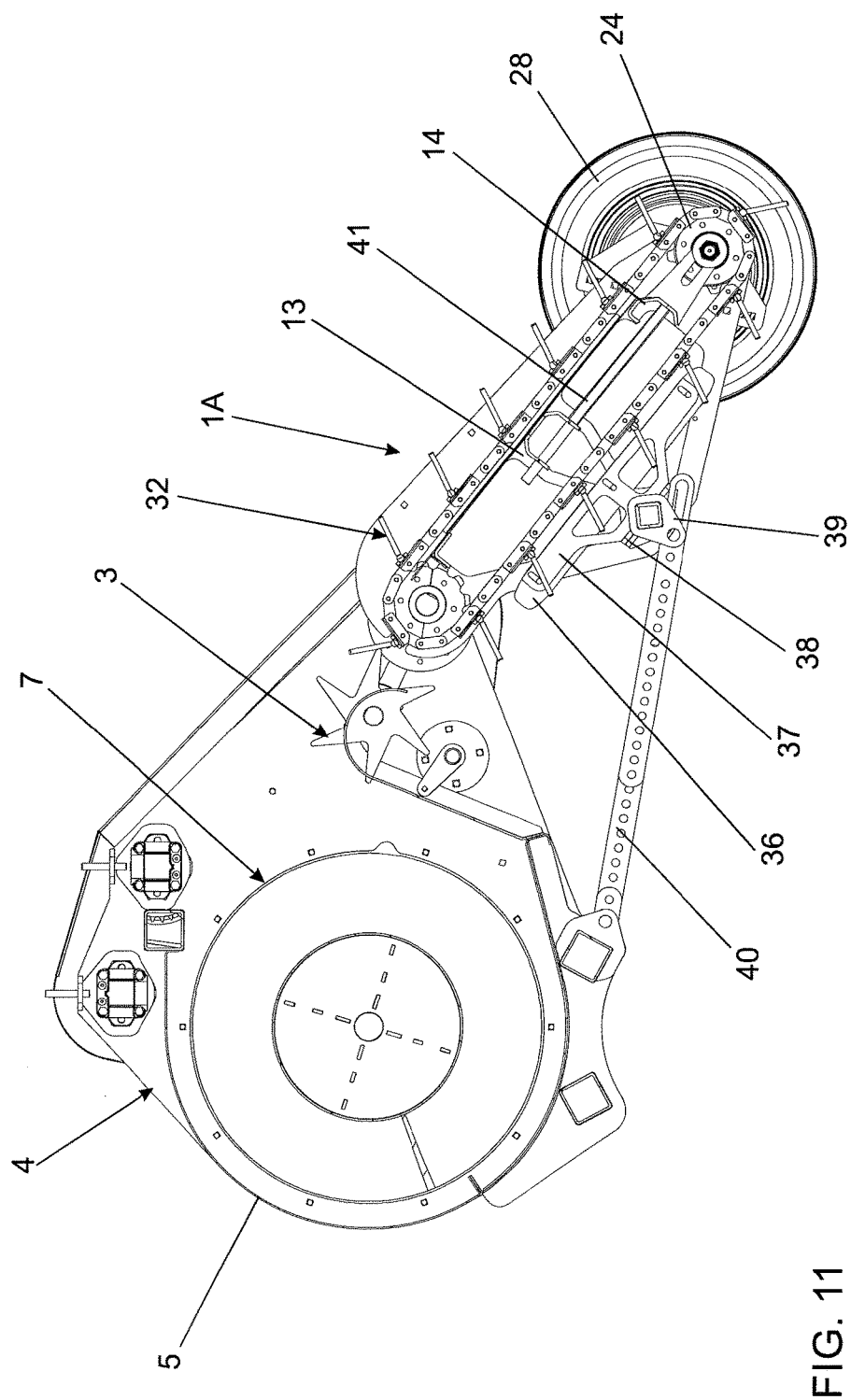
FIG. 11 shows a side sectional view of the entire assembly.

On the rear side of the structure (9), as illustrated by FIGS. 10 and 11, is assembled a pair or ruler shaped guides (36), adjustably fixed to supports (37), whose upper side serve as sliding support for transversal combs (32), and is fixed by its bottom side to other supports (38) assembled in the inferior crosspiece (11), where another fork support (39) is articulately fixed to the bottom extremity of a telescopic ruler for height regulation (40), whose upper extremity is also fixed to the transversal mounting structure (4).

Figure 9:
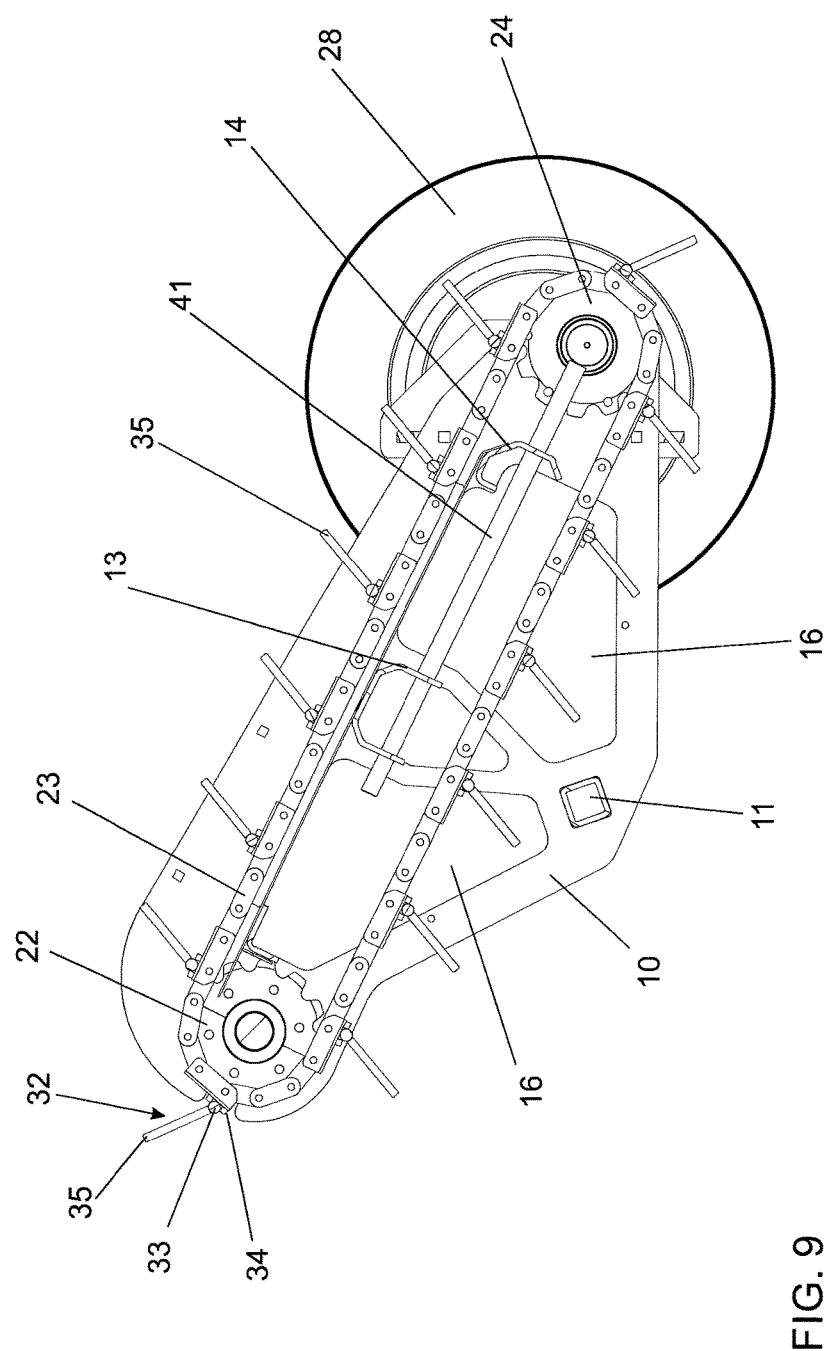
FIG. 9 shows a side sectional view of just the harvesting conveyor belt.

Also illustrated in FIGS. 9 and 10, each inferior gear (24) has its respective stretcher (41) fixed to the crosspieces (13) and (14).

Figure 12:
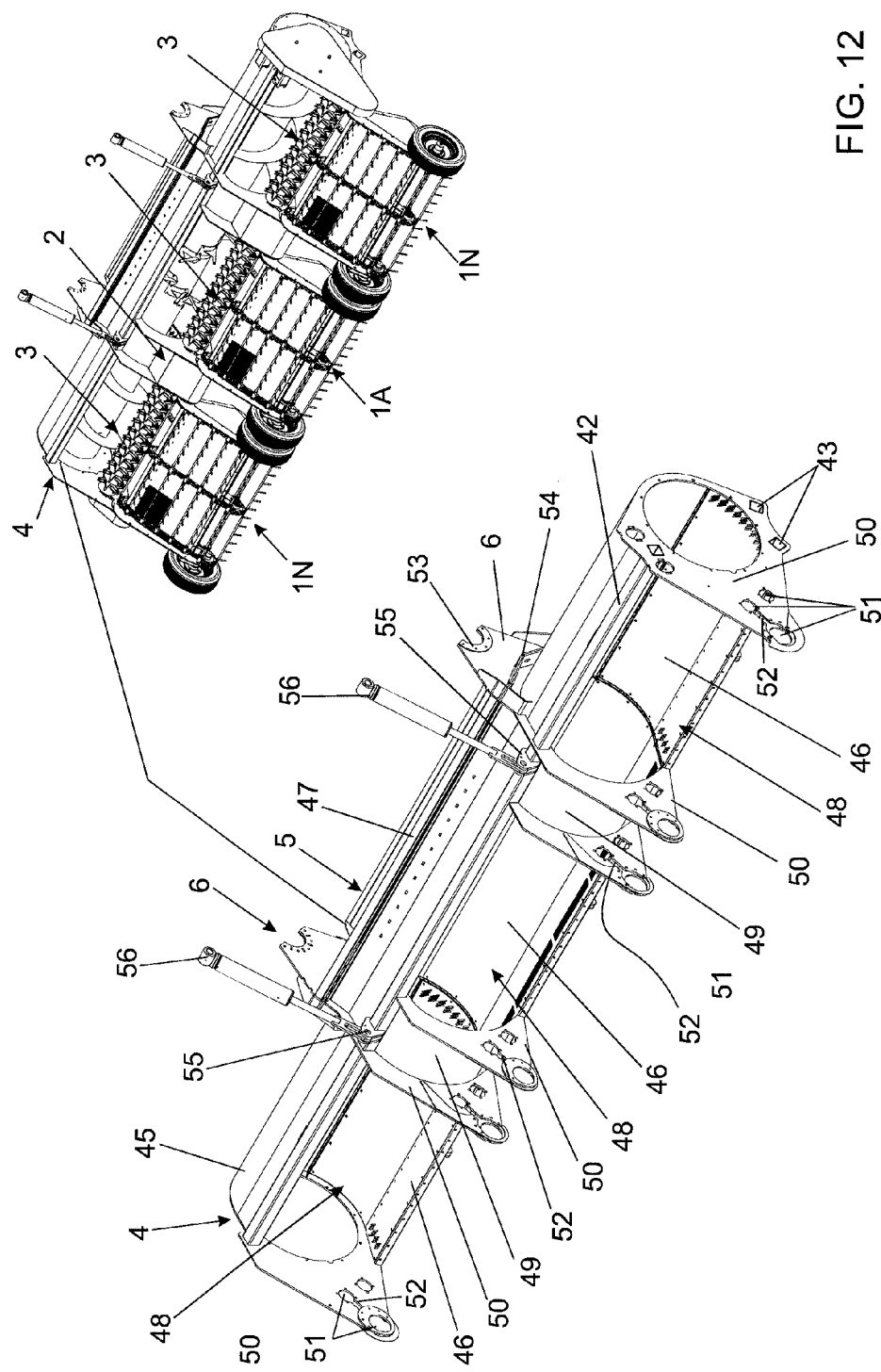
FIG. 12 shows a perspective view of an amplified detail that highlights the mounting structure of the assembly.
Figure 13:
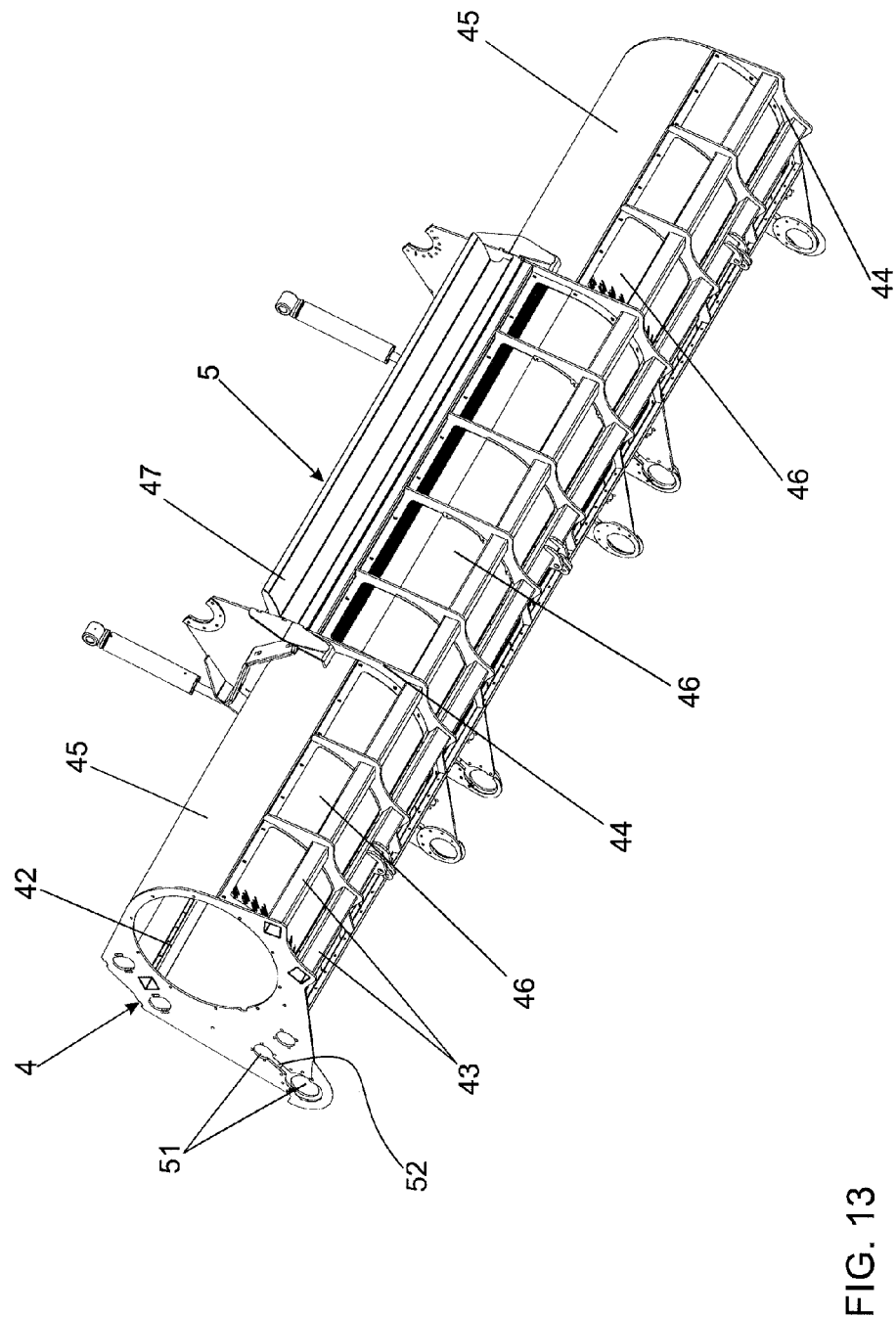
FIG. 13 shows a perspective view in a posteroinferior angle of just the mounting structure.
Figure 14:
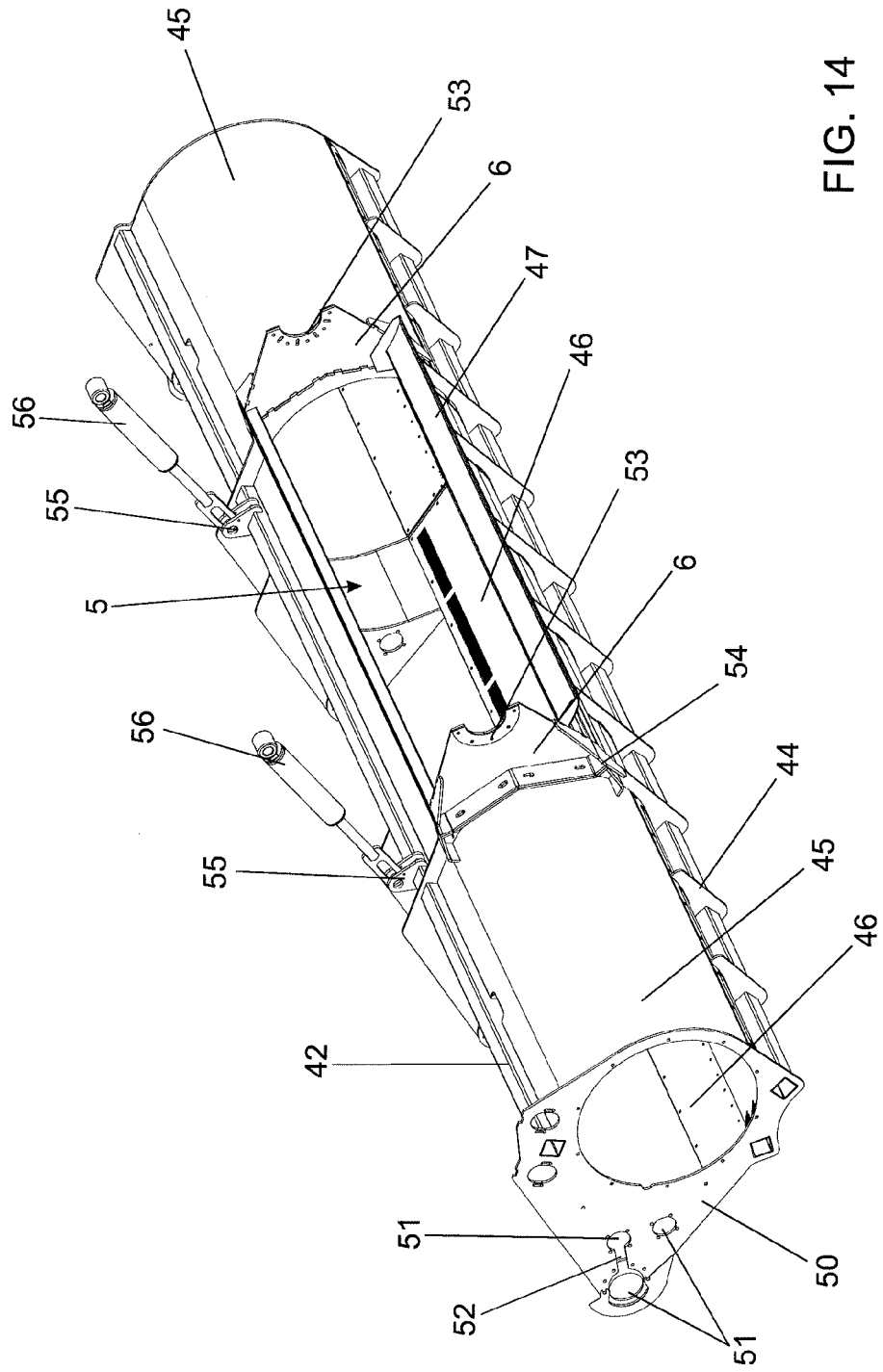
FIG. 14 shows another perspective view of the structure, highlighting the posterior exit of the gathered material.

The transversal mounting structure (4) is illustrated in detail in FIGS. 12, 13 and 14, where it can be seen that it has a defined cylindrical shape, initially, with squared longitudinal tubes, a superior one (42) and two inferior parallel ones (43), these last two receiving a plurality of plate pieces that form structural arcs (44), like support ribs that are completed with equally curved plate sheets (45). These plate sheets (45) serve as superior closure, under which the entire rear inferior regions is equipped with sieves (46), that are supported by the ribs (44), forming a circular tunnel equipped with a structural frame (47) at its exit (5), said frame is positioned exactly between the plate closures (45). The opposite front side of said tunnel is equipped with open longitudinal sections (48) that serve as entrances for the gathered material, sections that correspond exactly to the width of each conveyor belt (1A-1N) with semicircular separations (49) that are completed sideways by other ordinarily circular plate pieces (50), all of which are prolonged forward and have a circular housing (51), two of which are linked by a cut (52), forming two bearing for the upper extremities of the conveyor belts (1A-1N) and anti jamming rolls (3), as well as housing for the functional side by side coupling means (2) between conveyor belts (1A-1N).

Also illustrated in FIG. 14, the means (6) for articulated coupling to the front part of a machine are formed by triangular plate sheets, fixed to the edges of the structural frame (47), both with vertices facing outward and with a semicircular reinforced shape (53), with reinforcements (54) at its base.

The superior longitudinal tube (42) has, in its middle part, two fork shaped supports (55) which serve as articulated coupling for the lower extremities of the shock absorbers (56), whose upper extremities are equally coupled to a gathering and processing machine not illustrated.

Figure 15:
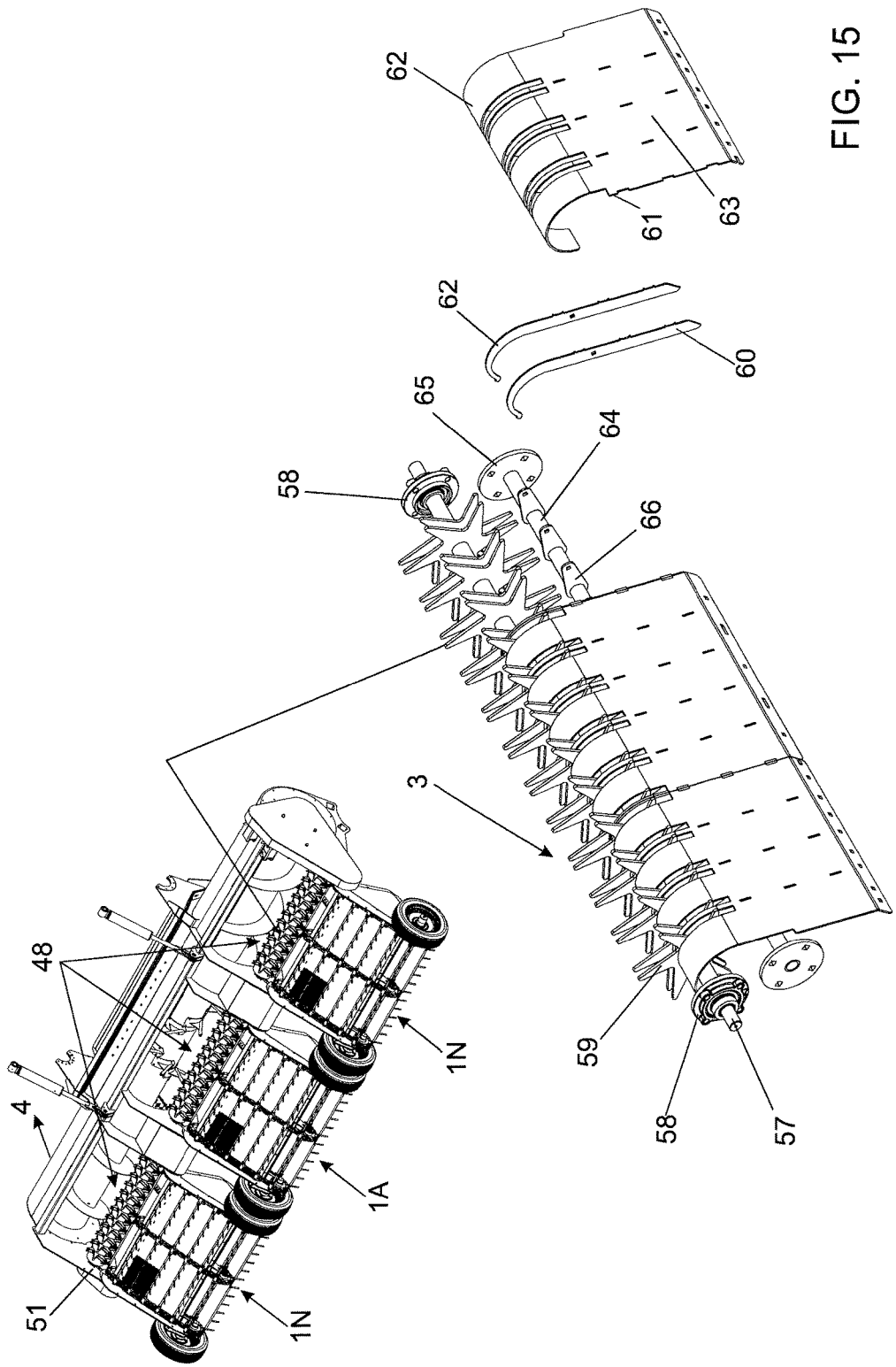
FIG. 15 shows a perspective view and an amplified detail also in perspective, highlighting the anti jamming roll assembly.
Figure 16:
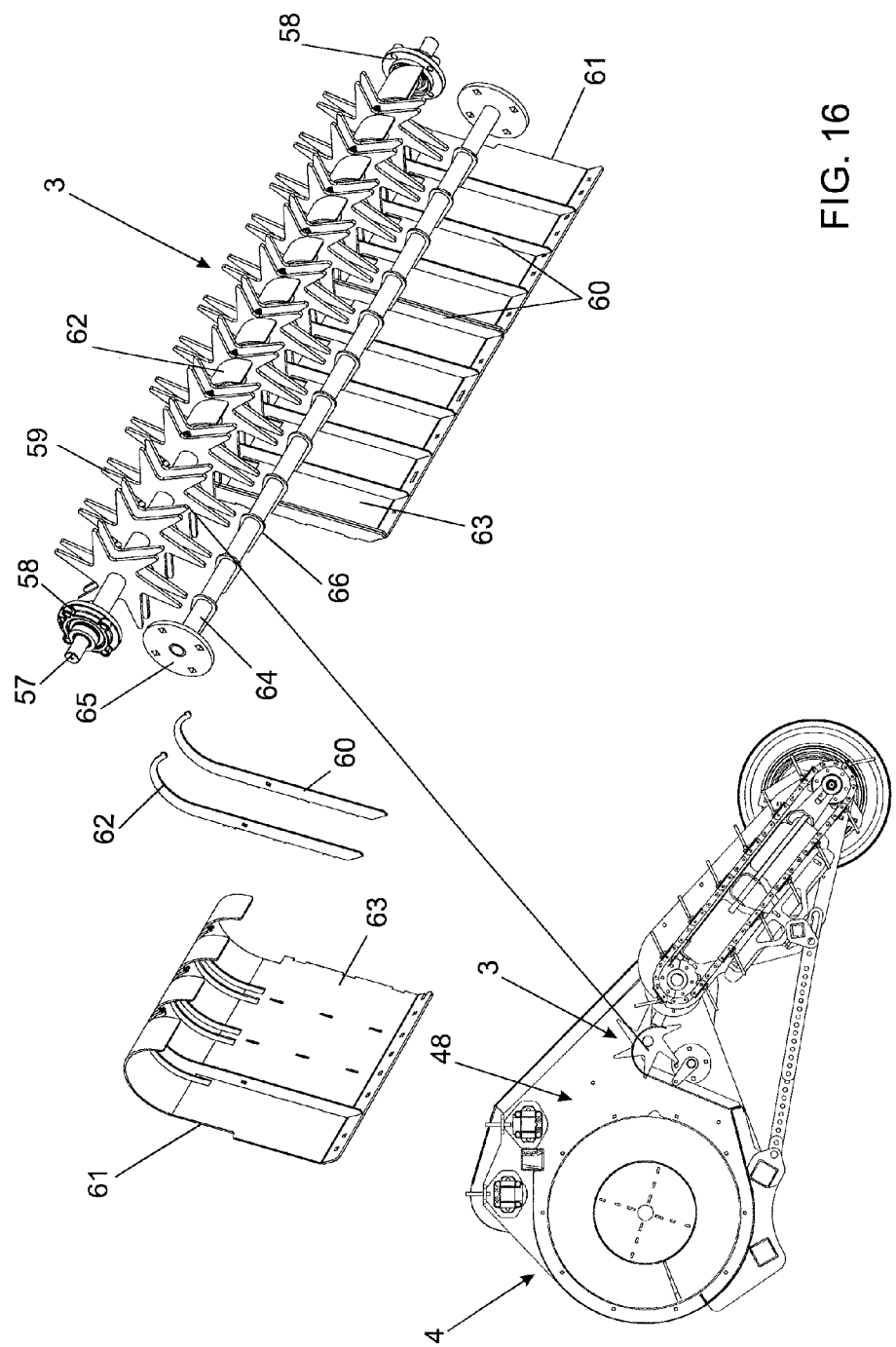
FIG. 16 shows a sectional side view and a detail in an exploded perspective showing other details of the anti-jamming roll.

One of the anti jamming rolls (3) is illustrated in detail in FIGS. 15 and 16, where it can be seen that it is formed by an shaft (57), whose bearing extremities (58) are coupled to the housings (51) of the structure (4), as well as in between said bearings, the shaft (57) is equipped with various pairs of dragging claws in the form of six point stars (59), in between which is formed a cleaner in the form of a plurality of thin hook pieces (60) and wide hook pieces (61) combined side by side in a way that its upper curved parts (62) may be positioned like a comb in between the claws (59), and its bottom side makes up a ramp (63) with a lower edge fixed to the lower edge of the corresponding open portion (48) of the structure (4), in the place where this assembly has a structural complement for fixation which is formed by a round bar (64) with flanges (65) for fixing to the parts (50) of the structure (4) and a plurality of radial supports (66) which are welded to the thin hook pieces (60). With this construction, the rotation of this assembly makes it possible that the moved plants at the end of the belt conveyors be hooked and launched backwards and inside of the structure (4), and at the same time, those curved pieces (60) and (61) work as a cleaning comb, preventing the plants from being jammed and continuing their movement, freely fall from ramp (63) to the inside of the structure (4) and continue the cleaning process.

Figure 17:
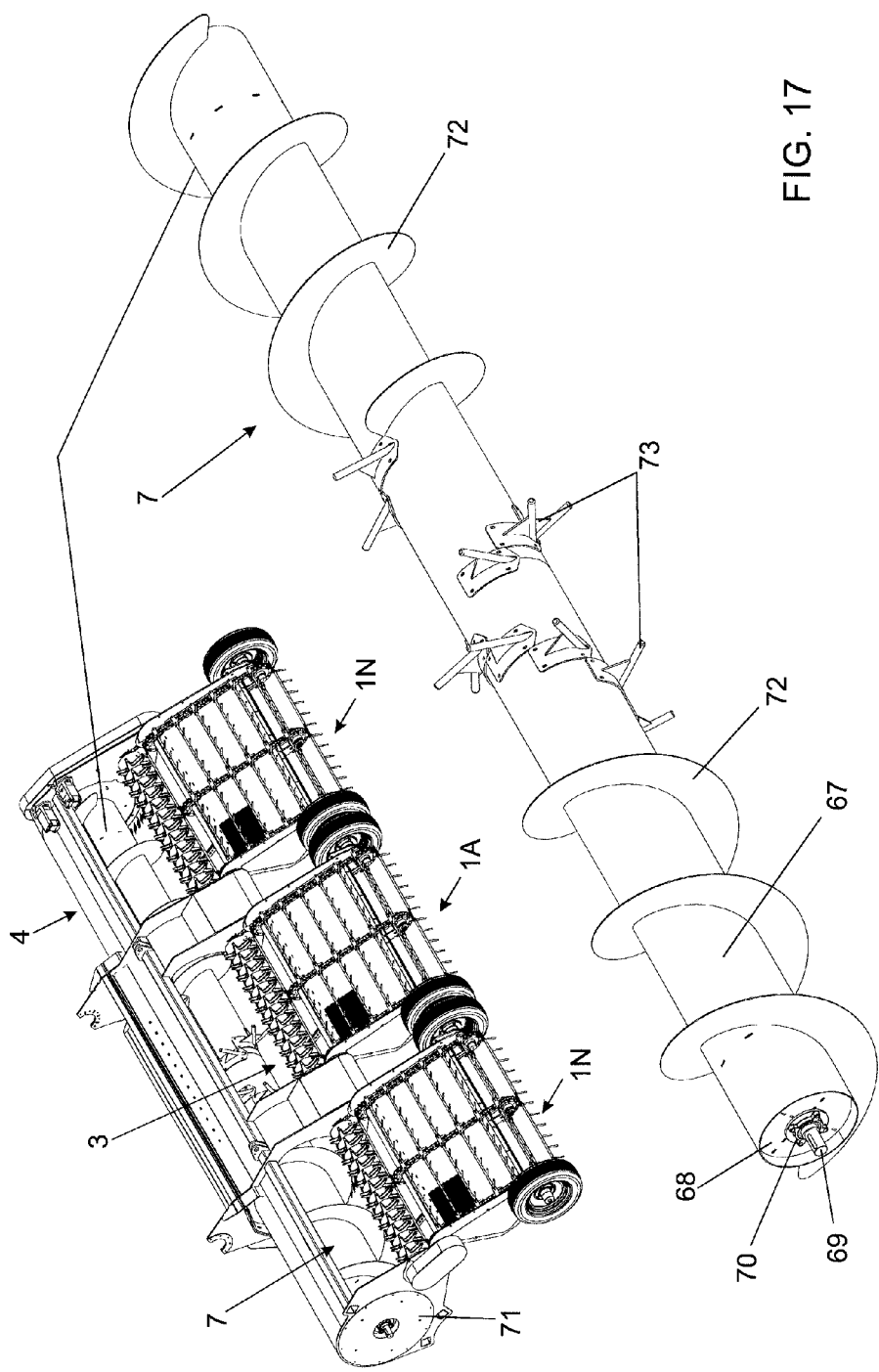
FIG. 17 shows a perspective view and an amplified detail highlighting the guiding roll.
Figure 18:
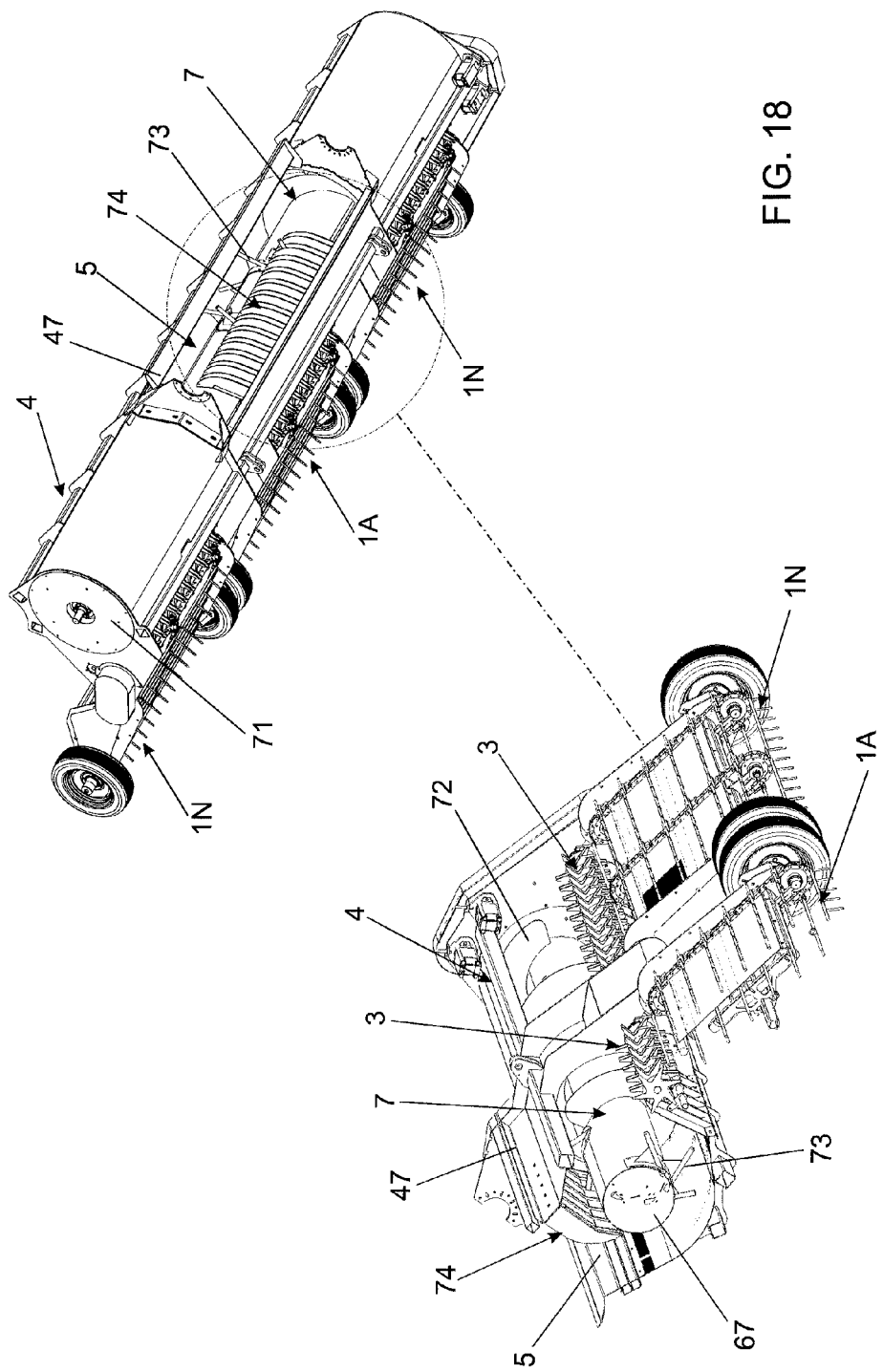
FIG. 18 shows a perspective view of the assembly set up, and a detail in perspective and sectional view highlighting the cleaning assembly of the guiding roll.
Figure 19:
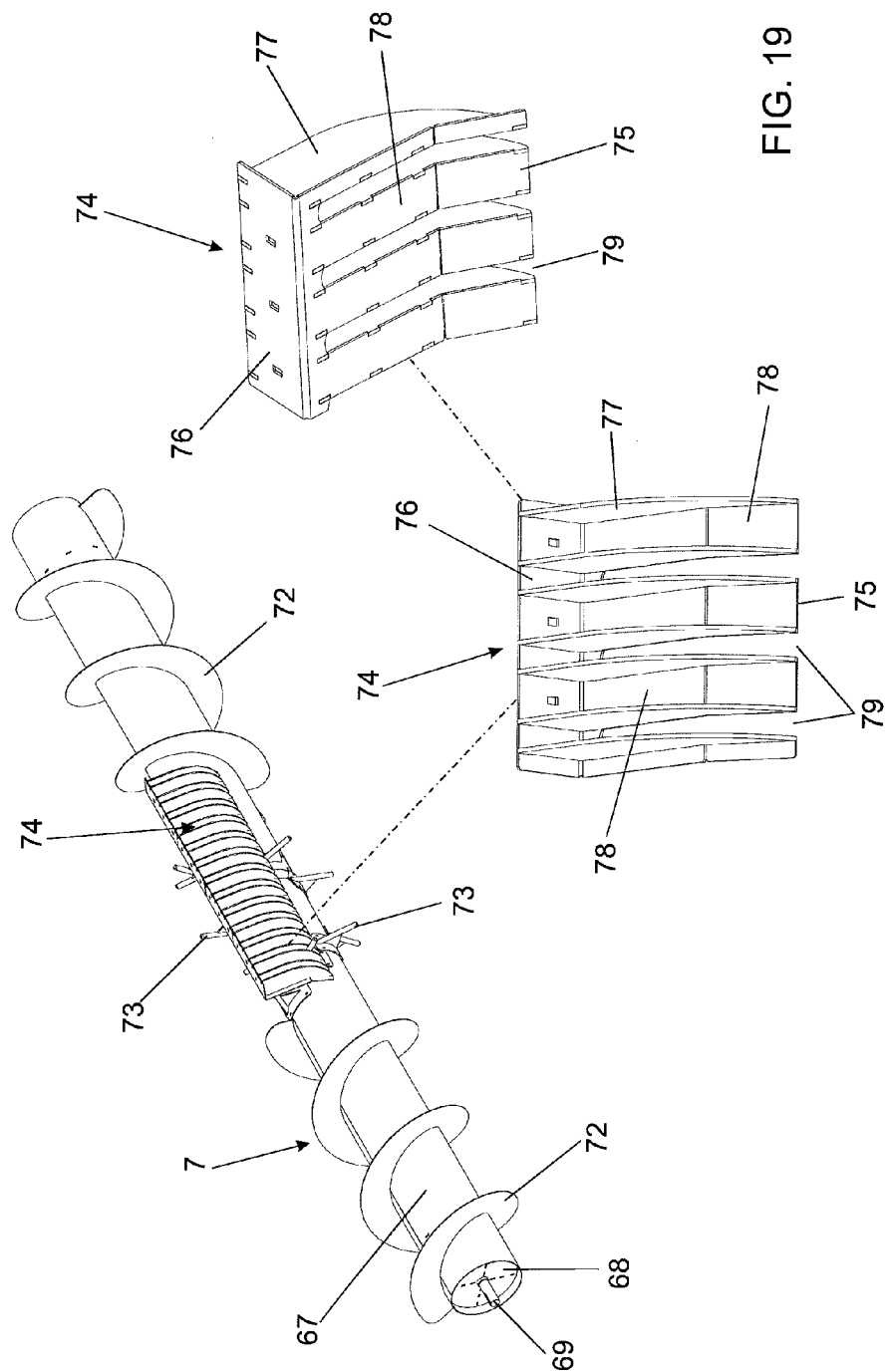
FIG. 19 shows a perspective view of the guiding roll and amplified details of the cleaning assembly.

FIGS. 17, 18 and 19 illustrate with details the guiding roll for the plants (7), where it can be seen that it is formed by a central tube (67), closed at its ends by blind flanges (68) with axle tips (69) and respective bearings (70) that allow rotation coupling of the closure discs assembly (71) of the mounting structure (4). The extremities of central tube (67) are equipped with inversed helical threads (72) that occupy approximately two thirds of the length of said central tube (67), resulting in a smooth middle section. In this middle section there are various pushing tips in the form of fingers (73), distributed in an helical alignment with equal inclination in between them, said fingers (73) are oriented in a way to serve as a cleaning comb (74), formed by various teeth (75), each of these with a U-shaped transversal section, having their upper extremity interconnected (76) and fixed directly to the superior edge of the frame (47) of the exit (5), as also each teeth has funneled and parallel side walls (77), while the wall that connects these last two (78) is folded inward, giving an arc shape to each teeth, the space in between each of these serving as passage for the various pushing tips in the form of fingers (73), in a way that the plants moved by the anti jamming rolls (3) of the conveyor belts (1A-1N) may be launched over the guiding roll for the plants (7), and there, the inversed helical threads (72) move the plants to the central part of the region with pushing tips (73), that push these plants backwards, pass them through the cleaning comb (74), and this, said plants flow backwards to the exit (5) for continuing the cleaning process.

Figure 20:
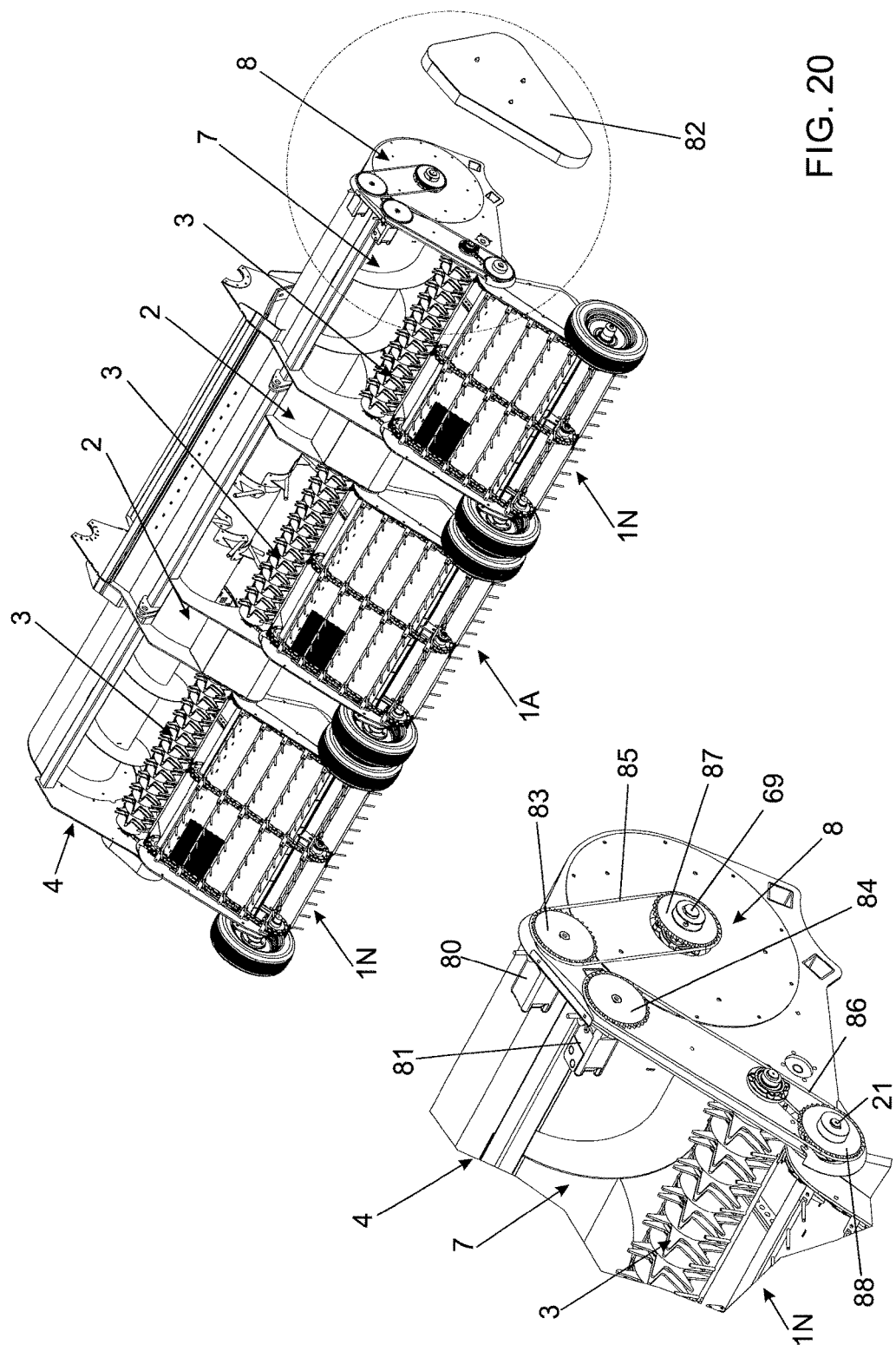
FIG. 20 shows a perspective view and an amplified detail highlighting the actuation means of the assembly.
Figure 21:
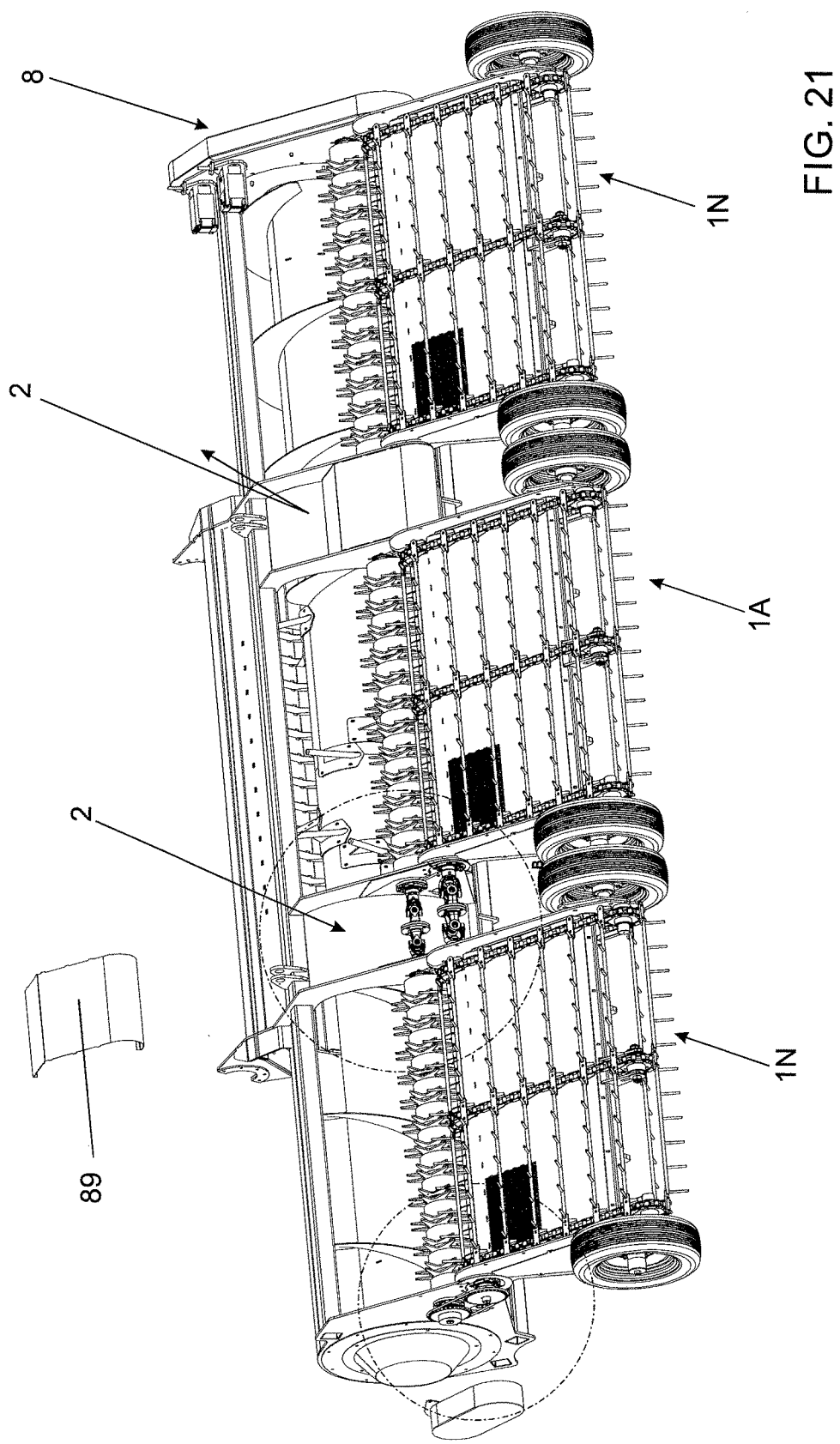
FIG. 21 shows the assembly in a perspective view highlighting the synchronization transmissions between the rolls and the harvesting conveyor belts.
Figure 22:
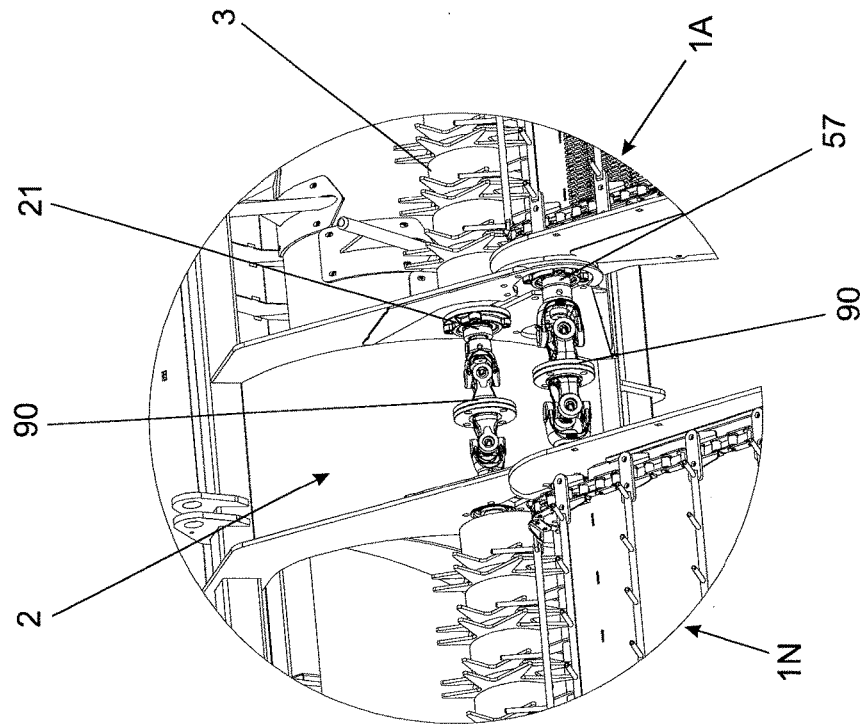
FIG. 22 shows in amplified details of the FIG. 21 showing the synchronization transmissions between the rolls and the harvesting conveyor belts.
Figure 22:
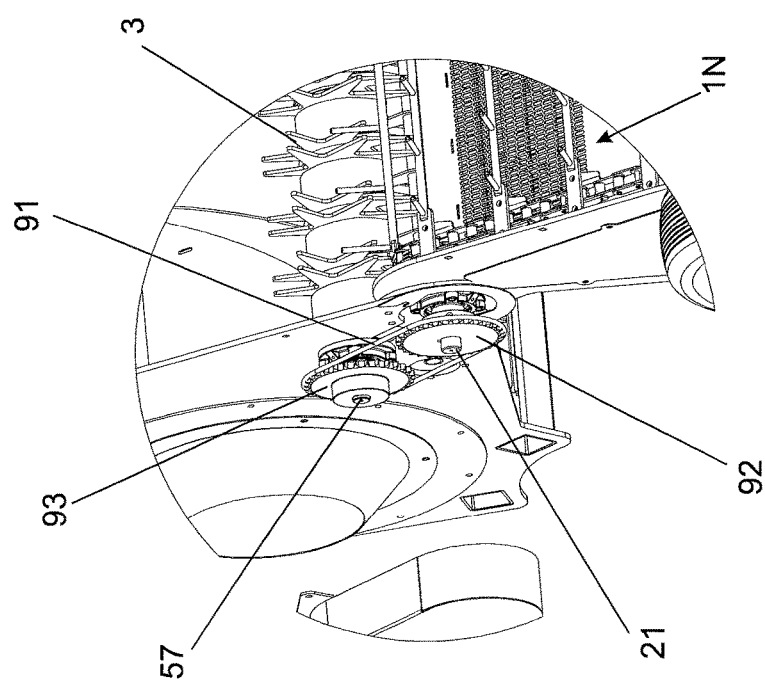

As illustrated by FIG. 20, the conveyor belts (1A-1N), the anti jamming rolls (3) and the guiding rolls for the plants (7) are synchronized by an actuation assembly (8), that is formed by two hydraulic engines (80 and 81), both with their shafts exposed on the side of the mounting structure (4), covered by a protection (82) and equipped each with a gear (83 and 84) and respective chains (85 and 86) coupled to other gears (87 and 88) one of them on axle (69) of the guiding roll for the plants (7), while the other is on the shaft (21) of the conveyor belt (1N), consequently, said hydraulic engines actuate the entire assembly. Also an integral part of the actuation assembly (8), seen in details in FIGS. 21 and 22, the side means for functional transmission defined by box and respective lids (89), each box is formed in between the two articulations of the conveyor belts (1A e 1N) of the mounting structure (4). Inside theses boxes are exposed the tips of shafts (21) and (57) of the conveyor belts (1A e 1N) and anti jamming rolls (3), these tips are connected by universal flanged joints (90) and also, the last conveyor belt (1N) on the opposite side of the actuation assembly, the power transmission of the belt conveyors is transmitted to the anti-jamming roll (3) by chains (91) and gears (92 and 93) on the shafts (21) and (57).

Therefore, the actuation of the entire assembly is a result of just two hydraulic engines (80-81), that though the working of the gears (83-84), chains (85-86) e gears (87-88) actuate the guiding roll for the plants (7) and all the conveyor belts (1A-1N) synchronized by the universal flanged joints. All the anti jamming rolls (3) are also actuated and synchronized by universal flanged joints (90) and gears (92-93) and chain (91). In this condition, the transversal combs (32) on the belt conveyors move upwards, this way, the plants from each row are gathered and launched over the guiding roll for the plants (7), and from these to the inside of the structure (4), where the guiding roll for the plants (7) moves all the plants to its central part, and from there to the rear exit (5). As has already been mentioned, the exit (5) unloads inside of a machine that will serve for the process of cleaning the plants, sort the fruits, peanuts for example, from the disposable parts.

The invention claimed is:

1. A modular gathering platform for grain harvesters comprising:
    a transversal mounting structure, having an internal opening; a central, a front and a rear portion; the rear portion defining an exit; and including articulated means for coupling to a front of a machine that processes harvested plants;
    at least one central harvesting conveyor belt, having a front and rear extremities and two sides coupling means; assembled to the front portion of the transversal mounting structure by the rear extremity;
    a first and second harvesting conveyor belts, each coupled to each of the two sides of the central harvesting conveyor belt, by the side coupling means; and each having a front and rear extremities; each assembled to the front portion of the transversal mounting structure by the rear extremity;
    an anti-jamming roll,
    a rotating guiding roll for harvested plants assembled on the internal opening of the mounting structure, the rotating guiding roll provided with means for receiving the harvested plants gathered by each of the at least one central harvesting conveyor belt and the first and second harvesting conveyor belts,
    wherein the at least one central harvesting conveyor belt and the first and second harvesting conveyor belts are inclined in such a manner that the front extremity is constructed and arranged in a manner leveled with the ground for enabling gathering of a previously prepared row; and the rear extremity is aligned with the respective anti-jamming roll,
    wherein the at least one central harvesting conveyor belt and the first and second harvesting conveyor belts, the anti-jamming rolls and the guiding roll for the plants are synchronized by an actuation assembly, and
    wherein the rotating guiding roll for harvested plants concentrating the harvested plants on the central portion of the structure and moving the harvested plants towards the exit.

2. The modular gathering platform for grain harvesters, according to claim 1, wherein the at least one central harvesting conveyor belt and the first and second harvesting conveyor belts further comprise:
    a structure, having a front side and a rear side and comprising two equal substantially triangular side plates sheets, having an inner side and an outer side;
        wherein each side plate having a first vertices facing down, the vertices linked by a tubular and lower squared crosspiece; and a second vertices linked by a first plate with a corner bracket section by a second U-shape intermediate plate, and a third C-shaped plate; all plates with a respective upper side aligned according to a support plane for a plate sieves assembly, and wherein each side plate includes multiple irregular openings covered by plate inspection lids, and wherein each side plate includes an upper extremity having a circular opening and cut forming a housing for bearings, the bearings providing rotating support, on which three gears are located, and wherein each side plate includes a lower extremity connected to a gear through cuts, and receiving a cube, a shaft, a reinforcement plate having a hole, and a wheel, and wherein each side plate is connected to each other by a crosspiece, the cross piece receiving a fork on a central portion, the fork attached to a gear, one first chain, positioned at a central portion of the at least one central harvesting conveyor belt and the first and second harvesting conveyor belts, and a second and third chains positioned by the inner sides of the side plates, of the at least one central harvesting conveyor belt and the first and second harvesting conveyor belts, the first, second and third chains supported by the rotating support;

a support plane supporting a plate sieves assembly, the sieves assembly located between the first plate the second U-shape intermediate plate and the third C-shaped plate; the sieve assembly moving multiple transversal combs, each of these combs formed by a bar with short flat pieces in one extremity attached to the corresponding chain; each of the bars having multiple radial teeth in the form of short cylindrical rods, the teeth constructed and arranged to work as raking claws;

a pair of ruler shaped guides, having an upper side and a lower side, the guides assembled to the rear side of the structure, adjustably fixed to supports, the upper side constructed and arranged to serve as sliding support for the transversal combs, and the ruler fixed by the lower side to supports assembled to the lower squared crosspiece, where a fork support is articulately fixed to a lower extremity of a telescopic ruler for height regulation, and an upper extremity is fixed to the transversal mounting structure, and a stretcher of each gear fixed to the U-shape intermediate plate and the third C-shaped plate.

3. The modular gathering platform for grain harvesters, according to claim 1, the transversal mounting structure further comprising:

a rear side including an upper squared longitudinal tube and two lower parallel tubes, the lower tubes receiving a plurality of plate pieces forming structural rib arcs; curved plate sheets, the plate sheets providing a closure of the transversal mounting structure; the structure encasing sieves supported by the rib arcs, forming a circular tunnel equipped with a structural frame at the exit, the frame positioned between the plate sheets;

an opposite front side, defining longitudinal opening sections providing for entrances for the gathered material, the sections corresponding exactly to the width of each central harvesting conveyor belt and the first and second harvesting conveyor belts, semicircular separations having outer circular plate pieces, prolonged forward and having each a circular housing, and a cut, forming two bearing for upper extremities of the central harvesting conveyor belt and the first and second harvesting conveyor belts, and anti jamming rolls, and housing for the two sides coupling means, assembled to the front portion of the transversal mounting structure by the rear extremity.

4. The modular gathering platform for grain harvesters, according to claim 3, wherein the articulated means further comprises triangular plate sheets, fixed to edges of the structural frame, the triangular plate sheets having vertices facing outward and with a semicircular reinforced shape, with reinforcements at a base.

5. The modular gathering platform for grain harvesters according to claim 3, wherein the upper squared longitudinal tubes include two fork shaped supports at a central section, serving as articulated coupling for lower extremities of shock absorbers, an upper extremity of the shock absorbers are coupled to a general gathering and processing machine.

6. The modular gathering platform for grain harvesters according to claim 1, wherein the anti-jamming roll comprises:

a shaft, including bearing extremities coupled to the housings of the structure, wherein, the shaft is equipped with multiple pairs of dragging claws in a form of six point stars, located between the bearings;

a cleaner in the form of a plurality of thin hook pieces and wide hook pieces, between the dragging claws, combined side by side in such a manner that upper curved parts may be positioned in a comb-like manner in between the claws, and a ramp at a bottom side with a lower edge fixed to a lower edge of the corresponding opening section of the structure;

a structural complement for fixation, comprising a round bar with flanges for fixing to the parts of the structure and a plurality of radial supports welded to the thin hook pieces.

7. The modular gathering platform for grain harvesters according to claim 1, wherein the rotating guiding roll for harvested plants further comprises:

a central tube, closed at ends by blind flanges with axle tips and respective bearings, the central tube constructed and arranged to allow rotation coupling of the closure discs assembly of the mounting structure; and inversed helical threads provided at extremities of the central tube at substantially two thirds of the length of said central tube, providing for a smooth middle section, and multiple pushing tips in the form of fingers, distributed in an helical alignment with equal inclination between them, the fingers oriented in a way to serve as a cleaning comb.

8. The modular gathering platform for grain harvesters, according to claim 7, wherein the cleaning comb comprises multiple teeth; each tooth including:

a U-shaped transversal section, having an upper extremity interconnected and fixed directly to a superior edge of the structural frame of the exit;

funneled and parallel side walls, and a wall connecting the funneled and parallel side walls folded inward, providing for an arc shape to each tooth, having a space between each providing for a passage for the multiple pushing tips in the form of fingers.

9. The modular gathering platform for grain harvesters according to claim 1, wherein the actuation assembly comprises two hydraulic engines, each including shafts exposed on the side of the mounting structure, covered by a protection and each equipped with first gears and respective chains coupled to second gears, wherein a first engine mounted on the axle tip of the guiding roll for the plants, and a second engine mounted on the rotating support of the second harvesting conveyor belts.

10. The modular gathering platform for grain harvesters, according to claim 1, wherein the side coupling means for functional transmission comprise each a box and respective lid, each box placed between two articulations of the at least one central harvesting conveyor belt and the first and second harvesting conveyor belts of the mounting structure, including internal boxes exposed to the tips of shafts and of the at least one central harvesting conveyor belt and the first and second harvesting conveyor belts and the anti-jamming rolls, the tips connected by universal flanged joints.

11. The modular gathering platform for grain harvesters, according to claim 1, wherein, the power on the at least one central harvesting conveyor belt and the first and second harvesting conveyor belts is transmitted to the anti-jamming roll by chains and gears on the shafts and, at the second harvesting conveyor belts on an opposite side of the actuation assembly.

* * * * *